(12) United States Patent
    Oshima

(10) Patent No.: US 11,023,739 B2
(45) Date of Patent: Jun. 1, 2021

(54) FLOW LINE COMBINING DEVICE, FLOW LINE COMBINING METHOD, AND RECORDING MEDIUM

(71) Applicant: NEC CORPORATION, Tokyo (JP)

(72) Inventor: Akiko Oshima, Tokyo (JP)

( * ) Notice: Subject to any disclaimer, the term of this patent is extended or adjusted under 35 U.S.C. 154(b) by 0 days.

(21) Appl. No.: 16/348,342

(22) PCT Filed: Nov. 17, 2017

(86) PCT No.: PCT/JP2017/041472
§ 371 (c)(1),
(2) Date: May 8, 2019

(87) PCT Pub. No.: WO2018/092881
PCT Pub. Date: May 24, 2018

(65) Prior Publication Data
US 2020/0057892 A1    Feb. 20, 2020

(30) Foreign Application Priority Data
Nov. 21, 2016 (JP) .............................. JP2016-225661

(51) Int. Cl.
G06K 9/00 (2006.01)
G06T 7/70 (2017.01)

(52) U.S. Cl.
CPC ..... *G06K 9/00771* (2013.01); *G06K 9/00335* (2013.01); *G06T 7/70* (2017.01);
(Continued)

(58) Field of Classification Search
None
See application file for complete search history.

(56) References Cited

U.S. PATENT DOCUMENTS 8,144,929 B2 *  3/2012  Takahashi ........... G06K 9/00369
                                             382/103
9,542,753 B2 *  1/2017  Mai ........................ G06T 7/246
(Continued)

FOREIGN PATENT DOCUMENTS

JP  2011-170564 A  9/2011
JP  2015-69452 A   4/2015
(Continued)

OTHER PUBLICATIONS

Metzler et al., "Application-driven merging and analysis of person trajectories for distributed smart camera networks", Video Surveillance and Transportation Imaging Application 2014 (Year: 2014).*
(Continued)

*Primary Examiner* — Soo Jin Park
(74) *Attorney, Agent, or Firm* — Sughrue Mion, PLLC

(57) ABSTRACT

The present invention provides a technique for enhancing the added value of flow line information. The flow line combining device is provided with: an acquisition unit for acquiring first flow line information indicating a trail of positions determined by using a first method and second flow line information indicating a trail of positions determined by using a second method which is different from the first method; a determination unit for assessing overlap in the trails respectively indicated by the acquired first flow line information and the second flow line information; and a combining unit for generating third flow line information which combines the first flow line information and second flow line information if the trail overlap assessed by the determination unit meets a predetermined condition.

14 Claims, 17 Drawing Sheets

(52) U.S. Cl.
CPC ............... *G06T 2207/30196* (2013.01); *G06T 2207/30232* (2013.01); *G06T 2207/30241* (2013.01)

(56) References Cited

U.S. PATENT DOCUMENTS

| | | |
|---|---|---|
| 10,095,954 B1 * | 10/2018 | Daliyot .................. G06T 7/292 |
| 10,387,896 B1 * | 8/2019 | Hershey ................. H04N 5/247 |
| 10,672,133 B2 * | 6/2020 | Shibata ............... G06K 9/00288 |
| 2015/0235237 A1 * | 8/2015 | Shaw ................. G06Q 30/0201 |
| | | 705/7.29 |

FOREIGN PATENT DOCUMENTS

| | | |
|---|---|---|
| JP | 2015-230616 A | 12/2015 |
| WO | 2011/021588 A1 | 2/2011 |
| WO | 2013/128852 A1 | 9/2013 |
| WO | 2013/145632 A1 | 10/2013 |

OTHER PUBLICATIONS

Anjum et al., "Trajectory association and fusion across partially overlapping cameras", IEEE International Conference on Advanced Signal and Video based Surveillance, 2009 (Year: 2009).*
International Search Report for PCT/JP2017/041472 dated Feb. 6, 2018 [PCT/ISA/210].
Written Opinion for PCT/JP2017/041472 dated Feb. 6, 2018 [PCT/ISA/237].

* cited by examiner

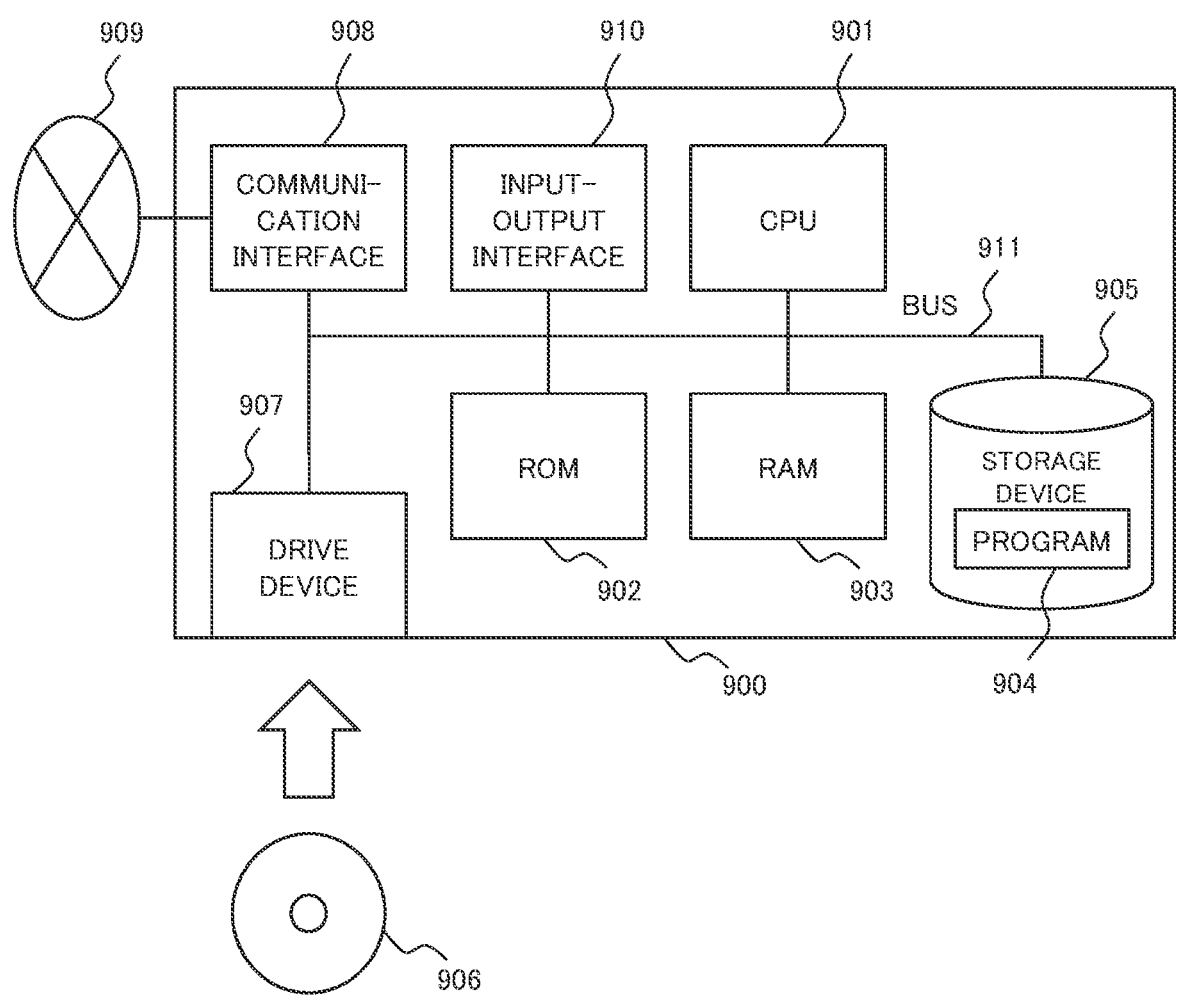

FLOW LINE COMBINING DEVICE, FLOW LINE COMBINING METHOD, AND RECORDING MEDIUM

CROSS REFERENCE TO RELATED APPLICATIONS

This application is a National Stage of International Application No. PCT/JP2017/041472, filed on Nov. 17, 2017, which claims priority from Japanese Patent Application No. 2016-225661, filed on Nov. 21, 2016, the contents of all of which are incorporated herein by reference in their entirety.

TECHNICAL FIELD

The present disclosure relates to a flow line synthesis device, a flow line synthesis method, and a recording medium.

BACKGROUND ART

There is known a method in which flow line information representing a trajectory of positions of a person is acquired, and the flow line information is associated with information of a person related to the flow line information (e.g., PTLs 1 and 2).

Further, a technique for interpolating an interruption of a flow line is disclosed. For example, PTL 3 discloses a technique of interpolating an interruption of a trajectory by connecting a plurality of pieces of trajectory information associated with same identification information by associating trajectory information with identification information by using a likelihood of a correspondence between trajectory information representing a fragment of a trajectory of a moving body due to occurrence of an interruption of the trajectory of the moving body, and identification information of the moving body.

CITATION LIST

Patent Literature

[PTL 1] Japanese Unexamined Patent Application Publication No. 2015-69452
[PTL 2] International Publication No. WO2013/145632
[PTL 3] International Publication No. WO2013/128852

SUMMARY OF INVENTION

Technical Problem

However, in techniques described in PTLs 1 and 2, since information acquired by a means different from a means for acquiring flow line information is associated with the flow line information, information to be associated with the flow line information is restricted. Further, in the technique of interpolating an interrupted flow line described in PTL 3, since flow lines having same additional information are connected to each other, additional information to be associated with flow line information representing the flow line serves as information originally included in the flow line information. Therefore, in the technique described in the above-described patent literature, an added value of flow line information is restricted.

The present disclosure has been made in view of the above-mentioned problem, and an object thereof is to provide a technique for enhancing an added value of flow line information.

Solution to Problem

An aspect of the disclosure is a flow line synthesis device. The flow line synthesis device includes acquisition means for acquiring first flow line information representing a trajectory of positions determined by a first method, and second flow line information representing a trajectory of positions determined by a second method different from the first method; determination means for determining overlapping of trajectories respectively represented by the acquired first flow line information and the second flow line information; and synthesizing means for generating third flow line information which is acquired by synthesizing the first flow line information and the second flow line information, and in which overlapping of trajectories determined by the determination means satisfies a predetermined condition.

Another aspect of the disclosure is a flow line synthesis method. The flow line synthesis method includes acquiring first flow line information representing a trajectory of positions determined by a first method, and second flow line information representing a trajectory of positions determined by a second method different from the first method; determining overlapping of trajectories respectively represented by the acquired first flow line information and the second flow line information; and generating third flow line information which is acquired by synthesizing the first flow line information and the second flow line information, and in which determined overlapping of trajectories satisfies a predetermined condition.

Note that a computer program that implements the above-described device or method by a computer, and a computer-readable non-temporary recording medium that stores the computer program are also included in the scope of the present disclosure.

Advantageous Effects of Invention

The present disclosure is able to enhance an added value of flow line information.

BRIEF DESCRIPTION OF DRAWINGS

FIG. 22 is a diagram exemplarily describing a hardware configuration of a computer (information processing device) capable of implementing each example embodiment.

EXAMPLE EMBODIMENT

First Example Embodiment

Figure 1:
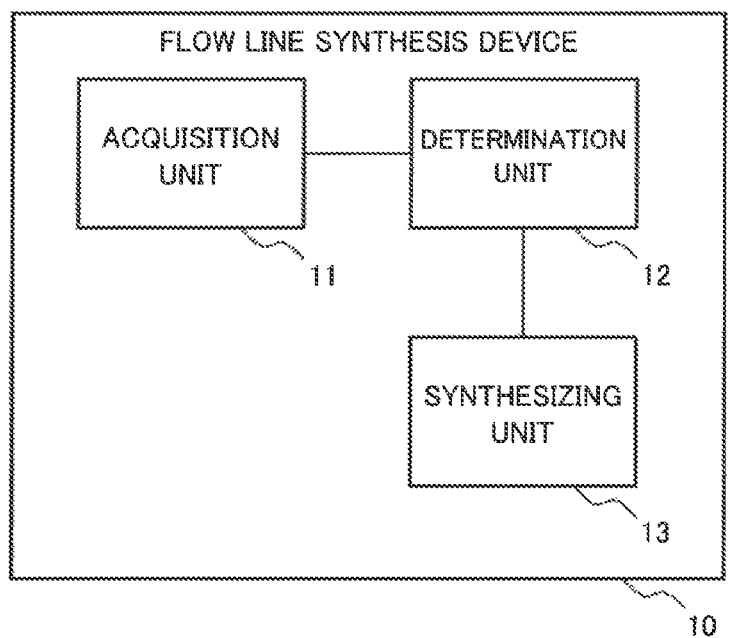
FIG. 1 is a block diagram illustrating an example of a configuration of a flow line synthesis device according to a first example embodiment.

A first example embodiment of the present disclosure is described in detail with reference to the drawings. FIG. 1 is a block diagram illustrating an example of a configuration of a flow line synthesis device 10 according to the present example embodiment. The flow line synthesis device 10 according to the present example embodiment includes an acquisition unit 11, a determination unit 12, and a synthesizing unit 13.

The acquisition unit 11 acquires first flow line information representing a trajectory of positions determined by a first method, and second flow line information representing a trajectory of positions determined by a second method different from the first method. The acquisition unit 11 acquires the first flow line information representing a trajectory of positions of a target. The first flow line information is generated from information on a displacement of the target position of a person or the like. The target is determined by analyzing an image acquired by an imaging device such as a camera, for example. The acquisition unit 11 acquires the first flow line information, from a device for generating the first flow line information, or from a storage device storing the first flow line information, for example. Further, the acquisition unit 11 may acquire the first flow line information from an imaging device. Furthermore, the acquisition unit 11 may generate the first flow line information by using an image acquired from an imaging device.

Further, the acquisition unit 11 acquires the second flow line information representing a trajectory of positions. The second flow line information is generated from sequential information on positions of a person. The positions are determined by using a radio frequency identification (RFID), Bluetooth (registered trademark), Wi-Fi (registered trademark), ZigBee (registered trademark), an infrared ray, or the like, for example. The acquisition unit 11 may acquire the second flow line information, which is generated by using information acquired by a geomagnetic sensor, or three-dimensional data acquired by a three-dimensional camera, for example. A trajectory of positions represented by the first flow line information, and a trajectory of positions represented by the second flow line information may be determined by using a different method for determining positions of a person. The acquisition unit 11 acquires the second flow line information from a device for generating the second flow line information, or a storage device for storing the second flow line information, for example. Further, the acquisition unit 11 may acquire, from a sensor for acquiring data capable of determining the positions, the data, and generate the second flow line information.

Each of a plurality of positions of a person, which is included in a trajectory represented by the first flow line information, is associated with a point of time when data used in determining the position are generated. Likewise, each of a plurality of positions of a person, which is included in a trajectory represented by the second flow line information, is associated with a point of time when data used in determining the position are generated. Hereinafter, a "point of time at a position" indicates a point of time when data used in determining the position are generated.

The acquisition unit 11 supplies, to the determination unit 12, the first flow line information and the second flow line information.

The determination unit 12 determines overlapping of trajectories respectively represented by the first flow line information and the second flow line information. First, the determination unit 12 receives, from the acquisition unit 11, the first flow line information and the second flow line information. Then, the determination unit 12 determines overlapping of each trajectory by comparing a position (referred to as a first position) included in a trajectory represented by the first flow line information and a point of time at the position, and a position (referred to as a second position) included in a trajectory represented by the second flow line information and a point of time at the position. The determination unit 12 determines overlapping of trajectories by comparing the second position determined by a second method at a point of time within a predetermined period from a point of time at the first position, and the first position, for example. The determination unit 12 supplies, to the synthesizing unit 13, information (hereinafter, referred to as a determination result) representing a result of determination.

The synthesizing unit 13 generates third flow line information, which is acquired by synthesizing the first flow line information and the second flow line information, and in which overlapping of trajectories determined by the determination unit 12 satisfies a predetermined condition. First, the synthesizing unit 13 receives, from the determination unit 12, a determination result on overlapping of trajectories. The synthesizing unit 13 receives, as the determination result, a degree of overlapping of trajectories respectively represented by the first flow line information and the second flow line information, for example. In this case, when a degree of the overlapping exceeds a predetermined threshold value, the synthesizing unit 13 generates third flow line information by synthesizing the first flow line information and the second flow line information.

For example, the synthesizing unit 13 may calculate, at each point of time, a midpoint of a coordinate of a second position, which is determined by a second method at a point of time within a predetermined period from a point of time at the first position included in a trajectory represented by the first flow line information, and a coordinate of the first position; and set, as the third flow line information, information including a set of a pair of a coordinate at a midpoint, and a point of time associated with the midpoint. The synthesizing unit 13 may generate the third flow line information, which includes a trajectory of one of positions included in the first flow line information and the second flow line information. The synthesizing unit 13 may generate the third flow line information including all positions included in the first flow line information and the second flow line information.

Figure 2:
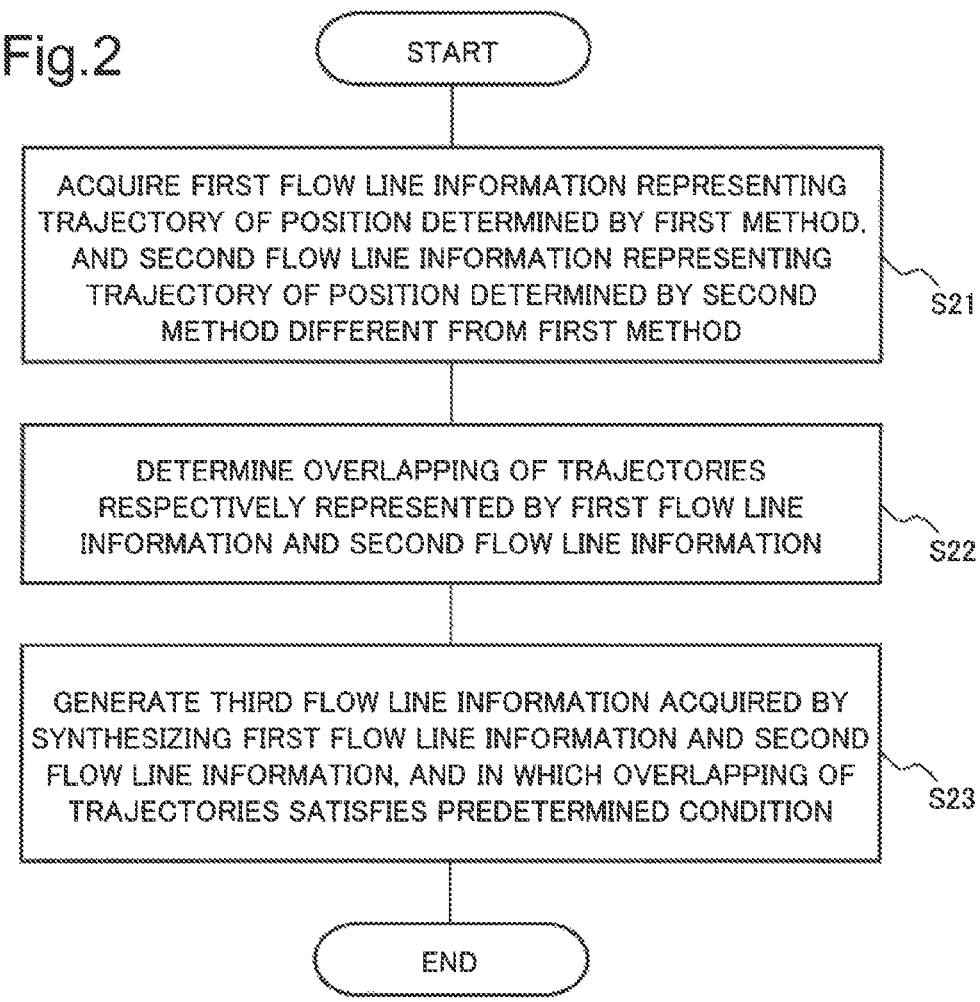
FIG. 2 is a flowchart illustrating an example of a flow of processing of the flow line synthesis device according to the first example embodiment.

Next, a flow of processing of the flow line synthesis device 10 according to the present example embodiment is described with reference to FIG. 2. FIG. 2 is a flowchart illustrating an example of a flow of processing of the flow line synthesis device 10 according to the present example embodiment.

As illustrated in FIG. 2, first, the acquisition unit 11 of the flow line synthesis device 10 acquires the first flow line information representing a trajectory of positions determined by a first method, and the second flow line information representing a trajectory of positions determined by a second method different from the first method (Step S21).

Then, the determination unit 12 determines overlapping of trajectories respectively represented by the first flow line information and the second flow line information acquired in Step S21 (Step S22).

Thereafter, the synthesizing unit 13 generates the third flow line information, which is acquired by synthesizing the first flow line information and the second flow line information, and in which overlapping of trajectories determined in Step S22 satisfies the predetermined condition (Step S23).

Thus, the flow line synthesis device 10 terminates the processing.

As described above, the flow line synthesis device 10 according to the present example embodiment generates the third flow line information, which is acquired by synthesizing the first flow line information and the second flow line information, and in which overlapping of trajectories satisfies the predetermined condition. The first flow line information represents a trajectory of positions determined by a first method, and the second flow line information represents a trajectory of positions determined by a second method different from the first method. In this way, the flow line synthesis device 10 according to the present example embodiment is able to synthesize pieces of flow line information acquired by different methods, based on overlapping of trajectories.

In this way, since the third flow line information is information acquired by synthesizing the first flow line information and second flow line information, the third flow line information is able to have features of the first flow line information and the second flow line information. Therefore, the third flow line information generated by the flow line synthesis device 10 according to the present example embodiment is able to have a high added value, as compared with the first flow line information and the second flow line information. Thus, the flow line synthesis device 10 according to the present example embodiment is able to enhance an added value of flow line information.

Second Example Embodiment

Figure 3:
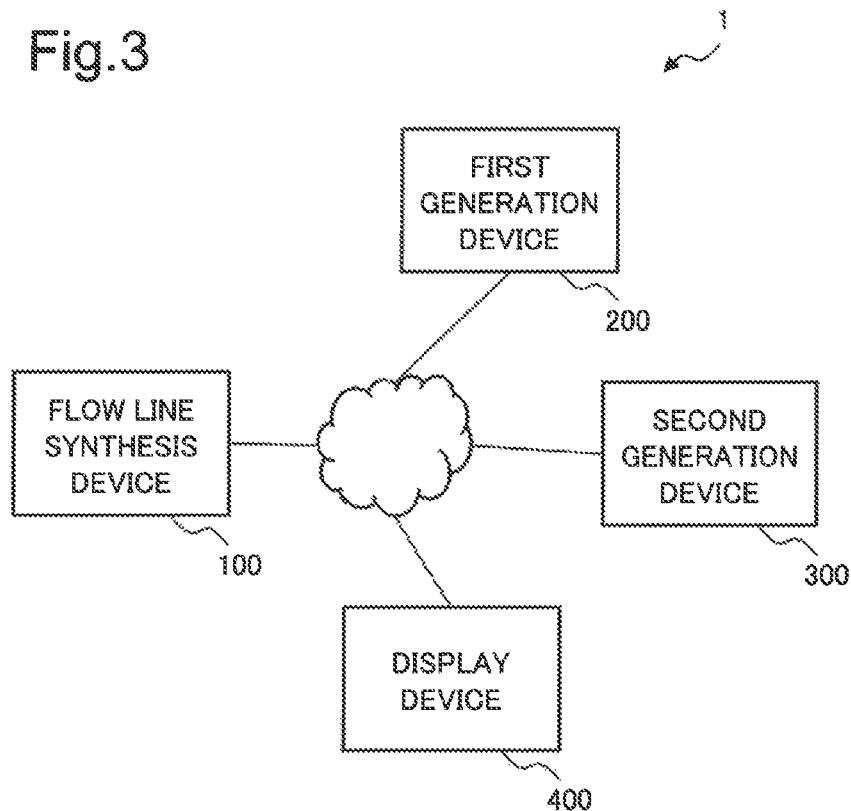
FIG. 3 is a block diagram illustrating an example of a configuration of a flow line synthesis system according to a second example embodiment.

Next, a second example embodiment of the present disclosure on the basis of the above-described first example embodiment is described with reference to the drawings. FIG. 3 is a diagram illustrating an example of a configuration of a flow line synthesis system 1 according to the present example embodiment. As illustrated in FIG. 3, the flow line synthesis system 1 includes a flow line synthesis device 100, a first generation device 200, and a second generation device 300. The flow line synthesis system 1 may further include a display device 400. The flow line synthesis device 100, the first generation device 200, the second generation device 300, and the display device 400 are communicably connected to one another. Note that each of the first generation device 200, the second generation device 300, and the display device 400 may be incorporated in the flow line synthesis device 100. Further, each of the first generation device 200 and the second generation device 300 may be plural.

The first generation device 200 acquires data capable of determining a position of a person. The first generation device 200 is implemented by an imaging device such as a monitoring camera, for example. In this case, the first generation device 200 generates, from information including time information on a position of a person, which is determined by analyzing a plurality of images included in moving image data acquired by capturing an image of the person, first flow line information representing a trajectory of the position. Then, the first generation device 200 supplies generated the first flow line information to the flow line synthesis device 100.

Each of a plurality of positions of a person, which is included in a trajectory represented by the first flow line information, is associated with a point of time when data (e.g., an image) used in determining the position are generated. Further, the first flow line information includes first additional information. First additional information is information, which is included in data used in determining a position, and is associated with a person except for a position of a target (e.g., the person) associated with the first flow line information. First additional information may be a feature of a person extractable from data used in determining a position, such as a sex, a generation, clothes, and the like, for example.

The second generation device 300 generates data capable of determining a position of a person. The second generation device 300 generates data including information representing a position of a person by measuring the position by using a radio frequency identification (RFID), Bluetooth, Wi-Fi, Zigbee, an infrared ray, or the like, for example. In this case, the second generation device 300 generates, from generated data, the second flow line information representing a trajectory of the position. The second generation device 300 may be a geomagnetic sensor, for example. Further, the second generation device 300 may be a floor pressure sensor, a sensor employing a radio wave of a global positioning system (GPS), or the like, for example. Further, the second generation device 300 may be a three-dimensional camera. The second generation device 300 supplies the second flow line information to the flow line synthesis device 100.

Each of a plurality of positions of a person, which is included in a trajectory represented by the second flow line information, is associated with a point of time when data used in determining the position are generated. Further, the second flow line information includes second additional information. Second additional information is information different from the above-described first additional information, and is information, which is included in data used in determining a position, and is associated with a person except for a position of the person associated with the second flow line information. Second additional information may be a feature of a person extractable from data used in determining a position such as a sex, a generation, clothes, and the like, for example.

The display device 400 displays a screen, based on a signal transmitted from the flow line synthesis device 100. The display device 400 is implemented by a liquid crystal display or the like, for example. When a signal received by the display device 400 is a designation indicating that a screen generated by the flow line synthesis device 100 is displayed, the display device 400 displays the screen. Further, when a signal received by the display device 400 is the third flow line information, the display device 400 may be configured to display a screen including a third flow line represented by the received third flow line information.

Note that, when the flow line synthesis device 100 has a function of generating the first flow line information, the first generation device 200 may supply generated data to the flow line synthesis device 100. Likewise, when the flow line synthesis device 100 has a function of generating the second flow line information, the second generation device 300 may supply generated data to the flow line synthesis device 100. Further, the first generation device 200 and the second generation device 300 may store the generated first flow line information and the second flow line information in a storage device accessible from the flow line synthesis device 100. Further, the first generation device 200 and the second generation device 300 may store data generated by the first generation device 200 and data generated by the second generation device 300 in a storage device accessible from the flow line synthesis device 100. Further, when the flow line synthesis system 1 includes a device for generating flow line information, the first generation device 200 and the second generation device 300 may output, to a device for generating the flow line information, data generated by the first generation device 200 and data generated by the second generation device 300.

Further, in the present example embodiment, description is made assuming that the first generation device 200 and the second generation device 300 are different devices. Alternatively, the first generation device 200 and the second generation device 300 may be a same generation device. In this case, the generation device may generate the first flow line information and the second flow line information by using a different method. Further, as described above, when the flow line synthesis system 1 includes a device for generating flow line information, the generation device may supply generated data to a device for generating the flow line information. Then, the device for generating the flow line information may generate the first flow line information and the second flow line information by using a different method, and supply the generated first flow line information and the second flow line information to the flow line synthesis device 100.

Further, the flow line synthesis system 1 according to the present example embodiment may further include an acquisition device. The acquisition device may be a device capable of acquiring information associated with a position and a person determined at the position. Further, the acquisition device may be implemented by a three-dimensional camera of a time of flight (TOF) method, for example. In this case, the acquisition device detects three-dimensional operation information of a person from acquired three-dimensional data. A point that the acquisition device is a device for acquiring information associated with a position of a person and the person will be described in the below-described fourth modification example. Note that the acquisition device may generate flow line information similarly to the first generation device 200 and the second generation device 300, or supply information capable of generating the flow line information to the flow line synthesis device 100.

Figure 4:
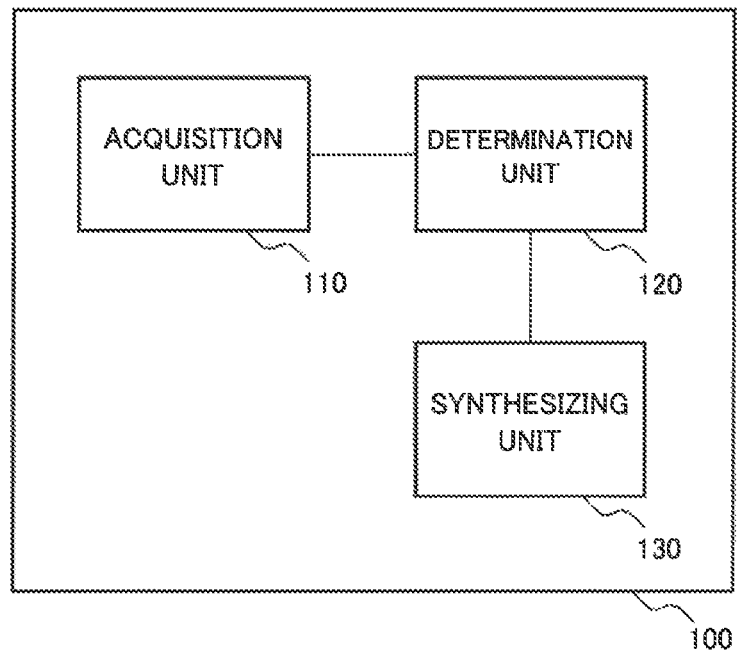
FIG. 4 is a functional block diagram illustrating an example of a functional configuration of a flow line synthesis device in the flow line synthesis system according to the second example embodiment.

Next, a configuration of the flow line synthesis device 100 is described with reference to FIG. 4. FIG. 4 is a functional block diagram illustrating an example of a functional configuration of the flow line synthesis device 100 of the flow line synthesis system 1 according to the present example embodiment. As illustrated in FIG. 4, the flow line synthesis device 100 in the present example embodiment includes an acquisition unit 110, a determination unit 120, and a synthesizing unit 130.

The acquisition unit 110 is an example of the acquisition unit 11 in the above-described first example embodiment. The acquisition unit 110 acquires the first flow line information and the second flow line information. In the present example embodiment, it is assumed that the acquisition unit 110 acquires the first flow line information from the first generation device 200. However, an acquisition destination of the first flow line information is not limited to this. The acquisition unit 110 may acquire the first flow line information from a device for generating the first flow line information, or a storage device for storing the first flow line information. Further, the acquisition unit 110 may generate the first flow line information by using an image acquired from the first generation device 200. Further, in the present example embodiment, it is assumed that the acquisition unit 110 acquires the second flow line information from the second generation device 300. However, an acquisition destination of the second flow line information is not limited to this. The acquisition unit 110 may acquire the second flow line information from a device for generating the second flow line information, or a storage device for storing the second flow line information. Further, the acquisition unit 110 may generate the second flow line information by using information acquired from the second generation device 300.

The acquisition unit 110 supplies the acquired first flow line information and the second flow line information to the determination unit 120.

The determination unit 120 is an example of the determination unit 12 in the above-described first example embodiment. The determination unit 120 receives the first flow line information and the second flow line information from the acquisition unit 110. The determination unit 120 determines overlapping of trajectories respectively represented by the first flow line information and the second flow line information. For example, the determination unit 120 determines overlapping of each trajectory by comparing the first position included in a trajectory represented by the first flow line information and a point of time at the first position, and the second position included in a trajectory represented by the second flow line information and a point of time at the second position. For example, the determination unit 120 determines overlapping of trajectories by comparing a second position determined from data generated at a point of time within a predetermined period from a point of time at a first position, and the first position. Then, the determination unit 120 supplies a result of determination to the synthesizing unit 130.

Figure 5:
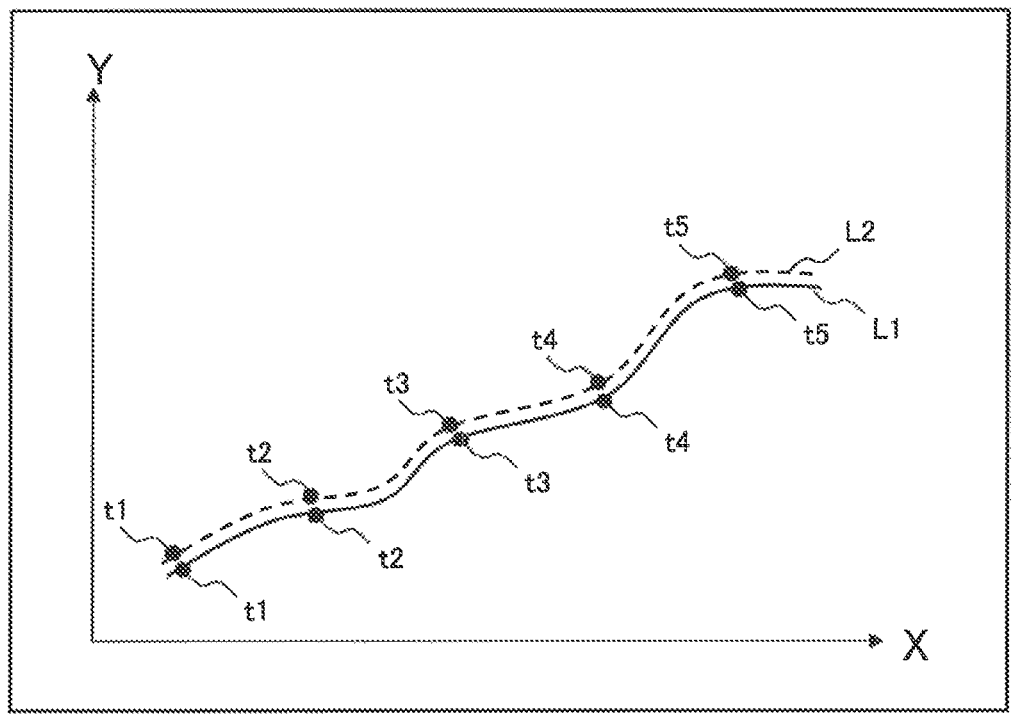
FIG. 5 is a diagram for describing an operation of a determination unit in the second example embodiment.
Figure 6:
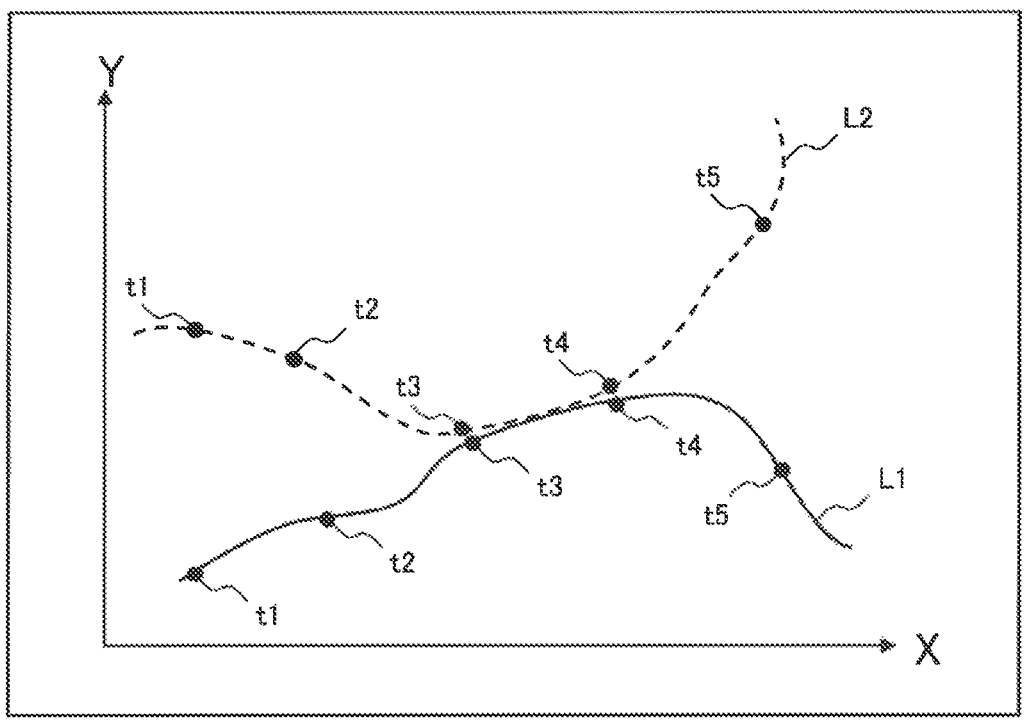
FIG. 6 is a diagram for describing an operation of the determination unit in the second example embodiment.
Figure 7:
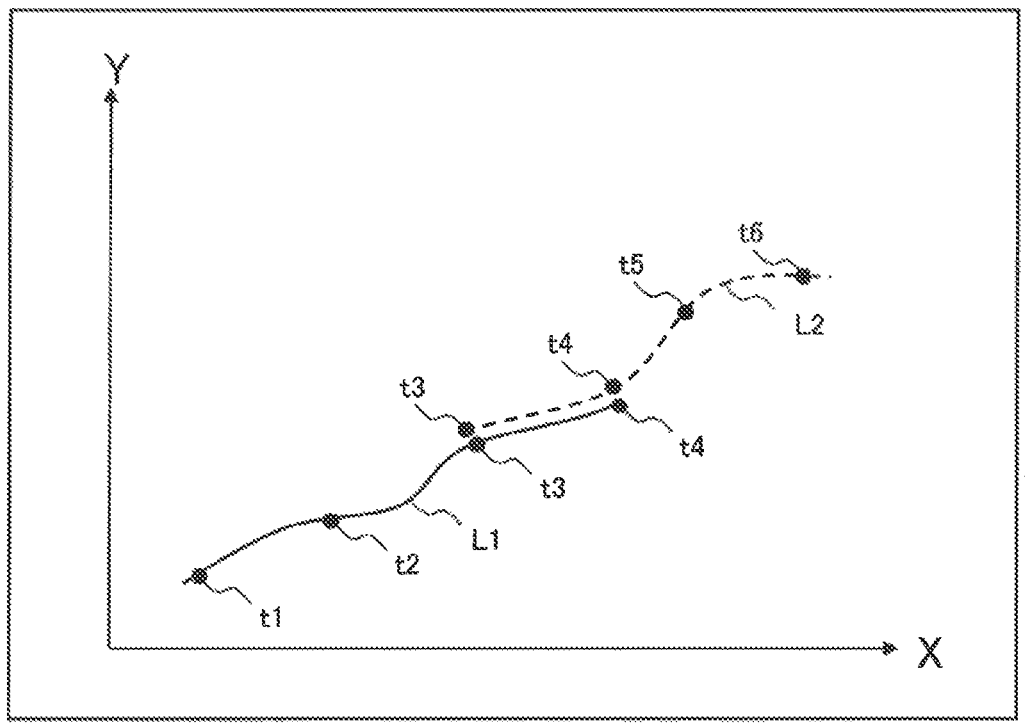
FIG. 7 is a diagram for describing an operation of the determination unit in the second example embodiment.

An operation of the determination unit 120 is further described with reference to FIGS. 5 to 7. FIGS. 5 to 7 are diagrams for describing an operation of the determination unit 120, and is a diagram illustrating an example when the first flow line information and the second flow line information are plotted on an XY-coordinate plane. In each of FIGS. 5 to 7, a horizontal axis is an X-axis, and a vertical axis is a Y-axis. Note that a flow line illustrated in each of FIGS. 5 to 7 is acquired by converting the generated first flow line information and the second flow line information into a coordinate value on an XY-coordinate plane for explanation. Further, in FIGS. 5 to 7, a first flow line L1 representing the first flow line information is illustrated by a solid line, and a second flow line L2 representing the second flow line information is illustrated by a broken line.

In FIG. 5, t1 to t5 illustrated on the first flow line L1 and the second flow line L2 represent points of time when data used in determining positions at the positions indicated by coordinates thereof are generated. Note that, for convenience of explanation, only five points of time are illustrated. However, it is needless to say that data may be acquired at a position indicated by a coordinate other than the above. Further, in FIG. 5, the point of time t1 on the first flow line L1 and the point of time t1 on the second flow line L2 indicate points of time coincident with each other. However, these points of time don't need to coincide with each other. For example, the point of time t1 on the second flow line L2 may be a point of time within a predetermined period from the point of time t1 on the first flow line L1. The same is similarly applied to the points of time t2 to t5. Further, the same is similarly applied to t1 to tN (where N is a natural number) in FIGS. 6 and 7. In the following description, it is assumed that a diagram on an XY-coordinate plane has a feature similar to the above.

The determination unit 120 compares a position included in the first flow line L1, and a position included in the second flow line L2 at a same point of time. The determination unit 120 compares a position included in the first flow line L1, and a position included in the second flow line L2 at each of points of time t1 to t5. Since the first flow line L1 and the second flow line L2 illustrated in FIG. 5 substantially coincide with each other in terms of a position at a same point of time, the determination unit 120 determines that the first flow line L1 and the second flow line L2 overlap each other at an overlapping point of time, and supplies a determination result to the synthesizing unit 130. The determination unit 120 may calculate a degree of overlapping (overlapping rate) as a determination result, and supply the overlapping rate to the synthesizing unit 130. In a case of the example of FIG. 5, the determination unit 120 may calculate an overlapping rate as 100%.

In a case of the first flow line L1 and the second flow line L2 illustrated in FIG. 6, the first flow line L1 and the second flow line L2 substantially coincide with each other in terms of positions at points of time t3 and t4, but are away from each other in terms of positions at points of time t1, t2, and time t5. As a determination result, the determination unit 120 supplies, to the synthesizing unit 130, a determination result indicating that positions at the points of time t3 and t4 substantially coincide with each other, and positions at the points of time t1, t2, and t5 are away from one another among overlapping points of time. Note that the determination unit 120 may set, as an overlapping rate, a value acquired by dividing a number of portions where positions coincide with one another by a number of determined positions. For example, in a case of the example of FIG. 6, positions are determined at five places, namely, at the points of time t1 to t5, and a number of portions where positions overlap is two. Therefore, the determination unit 120 calculates an overlapping rate as 40%. Further, the determination unit 120 may set, as an overlapping rate, a length of a flow line at a portion where positions overlap each other with respect to a length of a portion where points of time overlap each other on the flow line.

In a case of the first flow line L1 and the second flow line L2 illustrated in FIG. 7, a point of time when each position of the first flow line L1 and a point of time when each position included in the second flow line L2 overlap each other are points of time t3 and time t4. Positions at other points of time (points of time t1, t2, t5, and t6) are included only in either of the first flow line L1 or the second flow line L2. When points of time overlap each other, the determination unit 120 determines overlapping of positions at each point of time. Therefore, the determination unit 120 determines overlapping of positions between the first flow line L1 and the second flow line L2 at each of the points of time t3 and t4. As illustrated in FIG. 7, positions at the points of time t3 and t4 substantially coincide with each other. Therefore, the determination unit 120 determines that the first flow line L1 and the second flow line L2 overlap each other at overlapping points of time (the point of time t3 and the point of time t4), and supplies a determination result to the synthesizing unit 130.

The synthesizing unit 130 is an example of the synthesizing unit 13 in the above-described first example embodiment. The synthesizing unit 130 receives a determination result on overlapping of trajectories. The synthesizing unit 130 generates third flow line information, which is acquired by synthesizing the first flow line information and the second flow line information, and in which overlapping of trajectories determined by the determination unit 120 satisfies a predetermined condition. When a degree of overlapping of trajectories respectively represented by the first flow line information and the second flow line information exceeds a predetermined threshold value, for example, the synthesizing unit 130 generates the third flow line information by synthesizing the first flow line information and the second flow line information.

In the example illustrated in FIG. 5, the synthesizing unit 130 receives, from the determination unit 120, a determination result indicating that the first flow line L1 and the second flow line L2 overlap each other at overlapping points of time among points of time at respective positions of the first flow line L1 and the second flow line L2. Herein, it is assumed that a predetermined condition is that an overlapping rate exceeds a predetermined threshold value. For example, when a predetermined threshold value is 80%, the synthesizing unit 130 determines whether or not an overlapping rate calculated from a determination result or an overlapping rate received as a determination result exceeds a predetermined threshold value. In this case, since the overlapping rate exceeds a predetermined threshold value, the overlapping rate satisfies a predetermined condition. Therefore, the synthesizing unit 130 generates the third flow line information by synthesizing the first flow line information represented by the first flow line L1 and the second flow line information represented by the second flow line L2, based on a determination result. The synthesizing unit 130 generates the third flow line information including first additional information included in the first flow line information, and second additional information included in the second flow line information.

The synthesizing unit 130 calculates a midpoint between a position on the first flow line L1, and a position on the second flow line L2 at each point of time, for example. Then, the synthesizing unit 130 may set a set of a pair of a coordinate at a midpoint, and a point of time associated with the midpoint, as a third flow line represented by the third flow line information. Further, the synthesizing unit 130 may set a trajectory of one of positions included in the first flow line information and the second flow line information, as the third flow line represented by the third flow line information.

Figure 8:
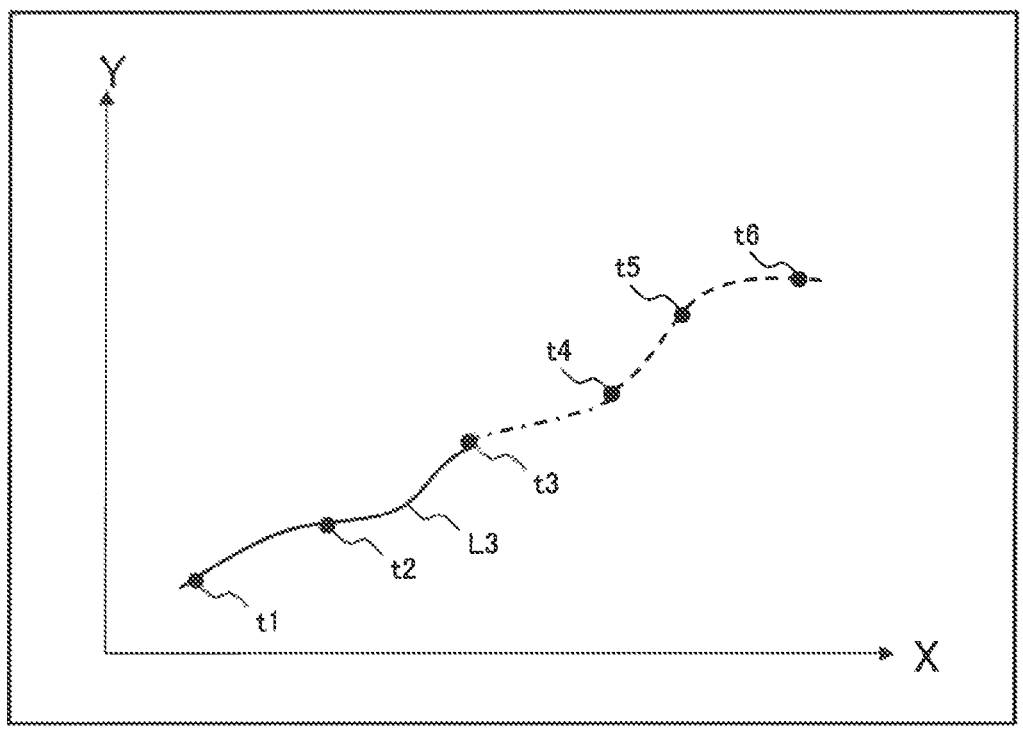
FIG. 8 is a diagram illustrating an example of a third flow line, when first flow line information representing a first flow line, and second flow line information representing a second flow line illustrated in FIG. 7 are synthesized.
Figure 9:
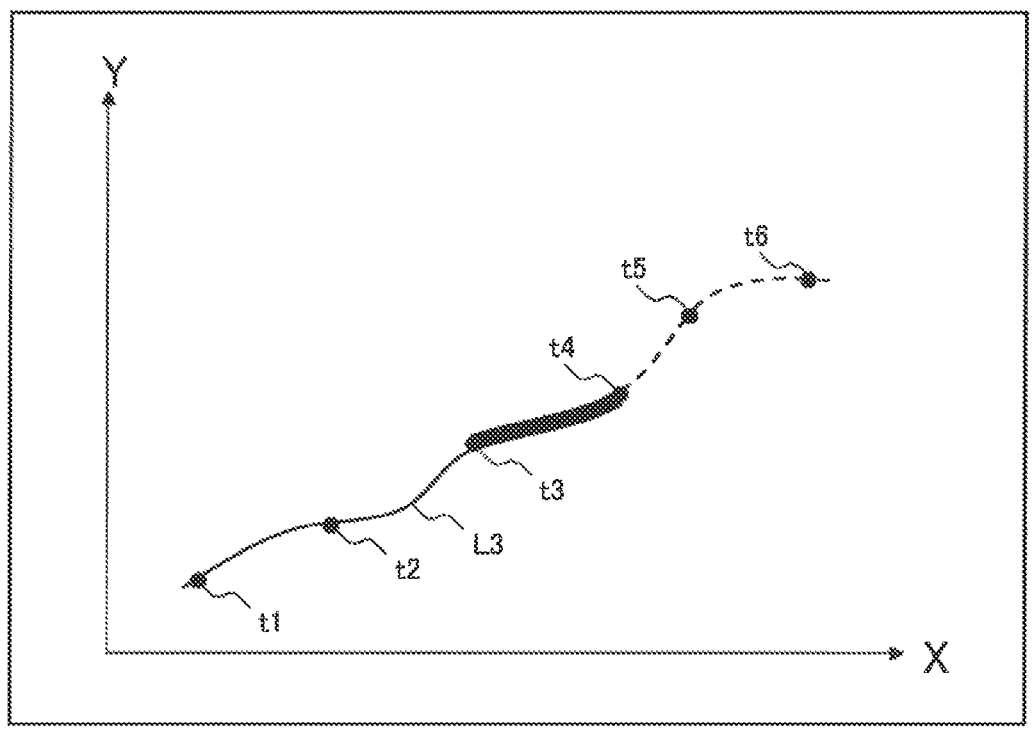
FIG. 9 is a diagram illustrating an example of the third flow line, when the first flow line information representing the first flow line, and the second flow line information representing the second flow line illustrated in FIG. 7 are synthesized.

FIGS. 8 and 9 illustrate an example of the third flow line represented by the third flow line information to be generated by the synthesizing unit 130. FIGS. 8 and 9 are diagrams illustrating an example of the third flow line, when the first flow line information representing the first flow line L1 and the second flow line information representing the second flow line L2 illustrated in FIG. 7 are synthesized. The third flow line illustrated in each of FIGS. 8 and 9 is a flow line acquired by converting the third flow line represented by the generated third flow line information into a coordinate on an XY-coordinate plane. In FIGS. 8 and 9, a horizontal axis indicates an X-axis, and a vertical axis indicates a Y-axis. Further, t1 to t6 indicate points of time similar to the points of time t1 to t6 included in FIG. 7.

In FIG. 8, the third flow line L3 is such that a portion corresponding to a portion of the first flow line L1 is indicated by a solid line, a portion of a line segment connecting between midpoints is indicated by a one-dotted chain line, and a portion corresponding to a portion of the second flow line L2 is indicated by a broken line. In this way, the third flow line L3 illustrated in FIG. 8 becomes a line connecting between midpoints of the first flow line L1 and the second flow line L2 at each point of time during a period when points of time overlap each other (a period from a point of time t3 to a point of time t4), and becomes a line employing the first flow line L1 or the second flow line L2 during a period when points of time do not overlap each other.

Further, the third flow line may have a width. Since the first flow line information and the second flow line information are acquired by using different methods, even when a same person is detected at a same point of time, an error may be included in a determined position. In such a case, a flow line including all positions included in the first flow line information and the second flow line information has a width. The synthesizing unit 130 may generate such third flow line information including all positions included in the first flow line information and the second flow line information. This example is illustrated in FIG. 9. The third flow line L3 illustrated in FIG. 9 is a line having a width and including all positions included in the first flow line L1 and the second flow line L2 during a period when points of time overlap each other (a period from a point of time t3 to a point of time t4), and is a line using the first flow line L1 or the second flow line L2 during a period when points of time do not overlap each other. Note that the width doesn't need to include all positions included in the first flow line information and all positions included in the second flow line information, and may be a part of positions included in the first flow line information and the second flow line information.

Further, as described above, in the third flow line L3 of FIG. 9, a period from the point of time t1 to the point of time t3 is a portion corresponding to a portion of the first flow line L1, and a portion from the point of time t4 to the point of time t6 is a portion corresponding to a portion of the second flow line L2. In this way, the third flow line information to be generated by the synthesizing unit 130 includes either one of positions, when only the either one of positions is present at a certain point of time in synthesizing the first flow line information and the second flow line information. A portion having a width included in the third flow line may be displayed in a pattern different from a portion without a width (a portion at either one of a first position or a second position), when being displayed on the display device 400. In other words, the synthesizing unit 130 may display, on the display device 400, a portion from t3 to t4 in FIG. 9 being a portion where trajectories are determined to overlap each other by the determination unit 120 on a flow line represented by the third flow line information, in a pattern different from a pattern of another portion. Thus, a user is allowed to visually distinguish the portion where trajectories overlap each other from a portion generated from either one of the first flow line information and the second flow line information.

The synthesizing unit 130 generates the third flow line information representing such a third flow line.

The synthesizing unit 130 may output the generated third flow line information to the display device 400, for example. Thus, a display device that receives the third flow line information is able to display, on a screen, the third flow line represented by the third flow line information in a pattern recognizable to a user. Note that the synthesizing unit 130 may generate a screen including the third flow line represented by the third flow line information, and transmit a generated screen to the display device 400. In this case, causing the display device 400 to display a received screen allows a user to recognize the third flow line. At this occasion, preferably, first additional information and second additional information included in the third flow line information may be included in a screen where the third flow line is displayed, in a pattern recognizable to a user.

Figure 10:
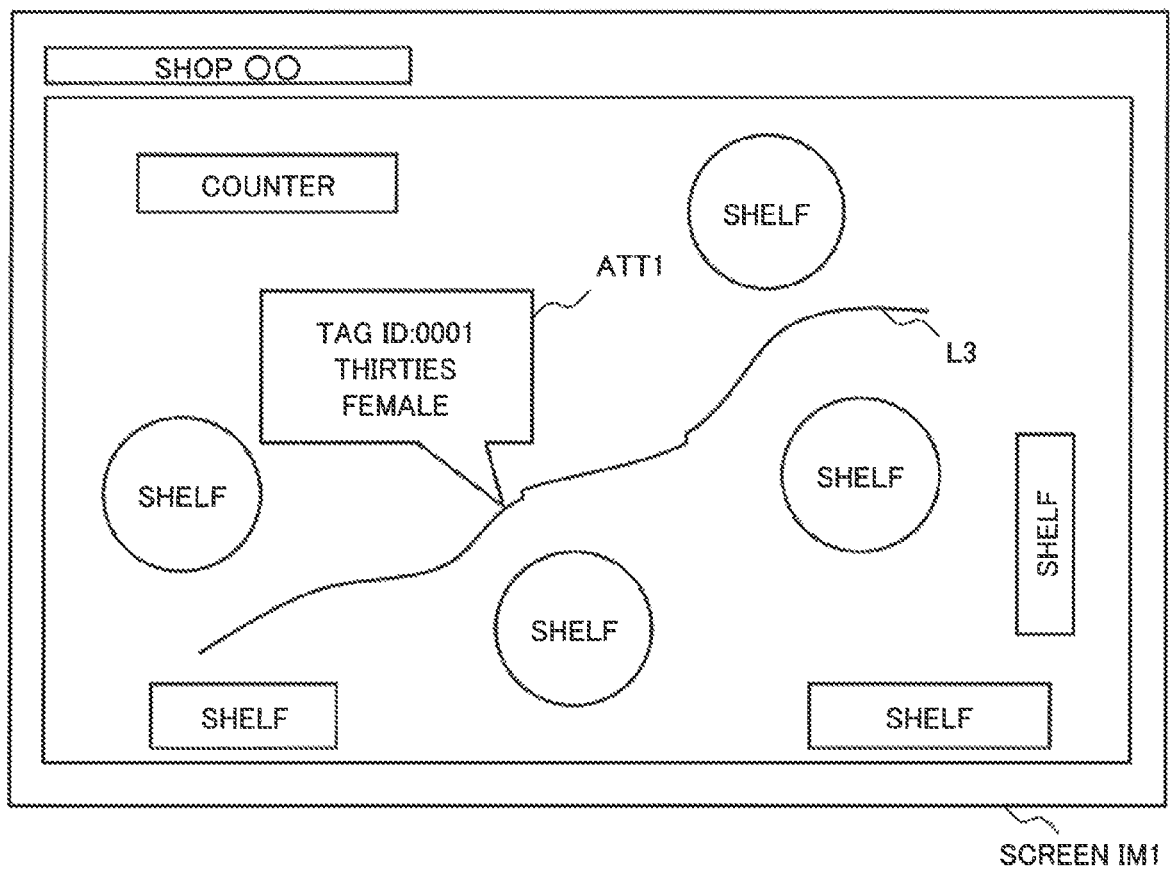
FIG. 10 is a diagram illustrating an example of a screen to be displayed by a display device.

FIG. 10 illustrates an example of a screen IM1 to be displayed by the display device 400. In the example illustrated in FIG. 10, it is assumed that first additional information is "thirties" and "female", and second additional information is "tag ID: 0001". A tag ID is an identifier for identifying an RF tag, when the second flow line information is a position determined by using an RFID, for example. Hereinafter, elements (in this case, "thirties", "female", and "tag ID: 0001") included in first additional information or second additional information are referred to as attributes. First additional information and second additional information have one or more attributes.

The third flow line L3 illustrated in FIG. 10 corresponds to the third flow line L3 illustrated in FIG. 8. In FIG. 10, the display device 400 displays the screen IM1 where the third flow line L3 is superimposed on a bird's eye view of a shop, namely, a place where data (e.g., an image) being a creation source of the first flow line information and the second flow line information are photographed (acquired). In this way, the display device 400 may display a screen where the third flow line is superimposed on a bird's eye view of a space serving as an acquisition target of data being a creation source of the first flow line information and the second flow line information. The following description is made based on a premise that a diagram of an example of a screen is a screen where the third flow line L3 is superimposed on a bird's eye view of a shop.

As described above, the third flow line information includes first additional information and second additional information. Therefore, as illustrated in FIG. 10, the display device 400 displays "thirties" and "female", which are included in first additional information, and additional information ATT1 including "tag ID: 0001", which is included in second additional information in association with the third flow line represented by the third flow line information.

Figure 11:
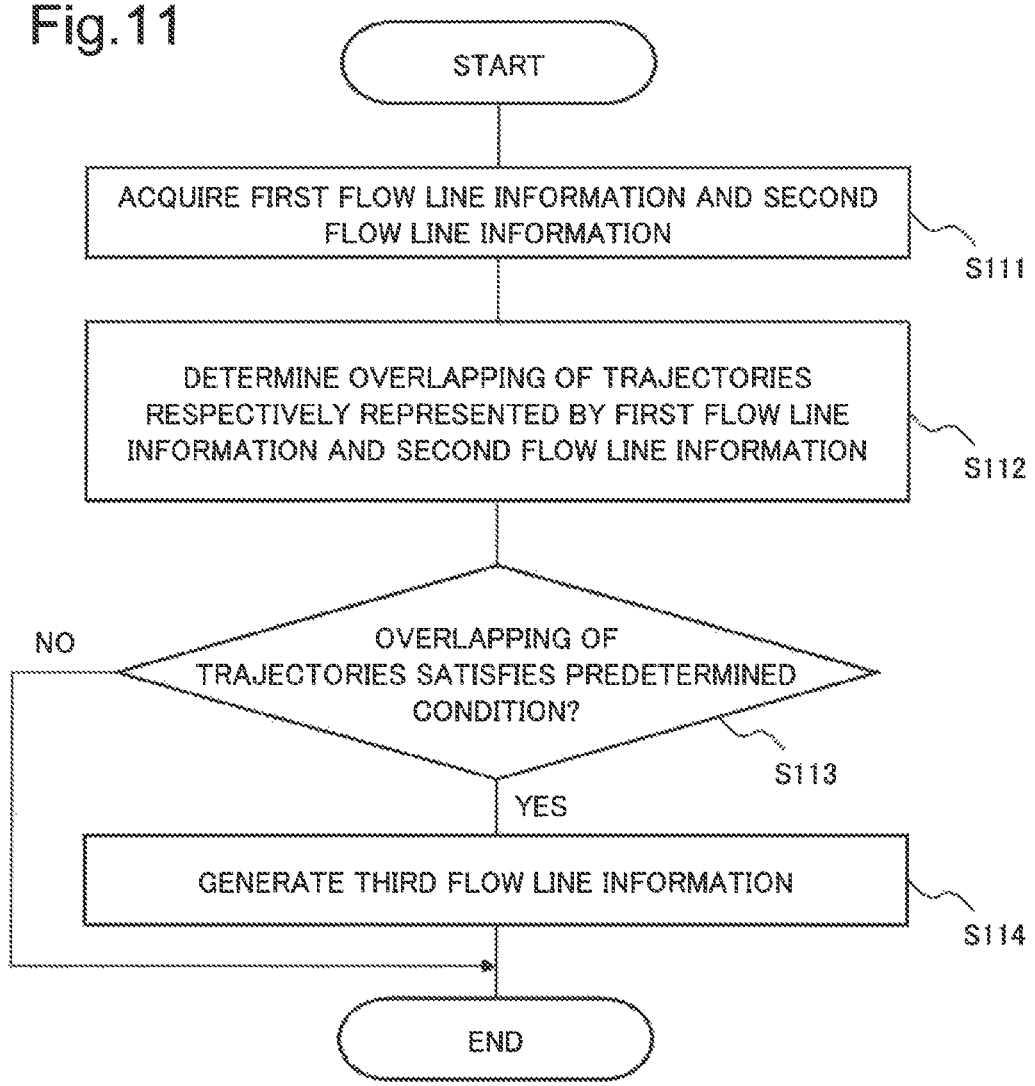
FIG. 11 is a flowchart illustrating an example of a flow of processing of the flow line synthesis device according to the second example embodiment.

Next, an operation of the flow line synthesis device 100 according to the present example embodiment is described with reference to FIG. 11. FIG. 11 is a flowchart illustrating an example of a flow of processing of the flow line synthesis device 100 according to the present example embodiment.

As illustrated in FIG. 11, first, the acquisition unit 110 of the flow line synthesis device 100 acquires the first flow line information representing a trajectory of positions determined by a first method, and the second flow line information representing a trajectory of positions determined by a second method different from the first method (Step S111).

Then, the determination unit 120 determines overlapping of trajectories respectively represented by the first flow line information and the second flow line information acquired in Step S111 (Step S112).

The synthesizing unit 130 confirms whether or not the overlapping of trajectories determined by the determination unit 120 satisfies a predetermined condition (Step S113). When the overlapping does not satisfy the predetermined condition (NO in Step S112), the processing is terminated. When the overlapping satisfies the predetermined condition (YES in Step S112), the synthesizing unit 13 generates the third flow line information, which is acquired by synthesizing the first flow line information and the second flow line information (Step S114).

Thus, the flow line synthesis device 100 terminates the processing.

As described above, similarly to the flow line synthesis device 10 according to the above-described first example embodiment, the flow line synthesis device 100 according to the present example embodiment generates the third flow line information acquired by synthesizing first flow line information and second flow line information. The third flow line information has a feature of the first flow line information and the second flow line information. Therefore, the third flow line information generated by the flow line synthesis device 100 according to the present example embodiment is able to have a high added value, as compared with the first flow line information and the second flow line information. Thus, the flow line synthesis device 100 according to the present example embodiment is able to enhance an added value of flow line information.

Further, the determination unit 120 determines overlapping of trajectories by comparing a position included in each of the first flow line information and the second flow line information, and a point of time at the position. Thus, the determination unit 120 is able to determine whether or not positions determined by using different methods are positions associated with a same target.

Further, since the first flow line information includes first additional information, the second flow line information includes second additional information different from the first additional information, and the third flow line information includes the first additional information and the second additional information, the third flow line information is able to have a high added value, as compared with the first flow line information and the second flow line information.

Further, when a degree of overlapping exceeds a predetermined threshold value, the synthesizing unit 130 generates the third flow line information. When a degree of overlapping between the first flow line information and the second flow line information exceeds a predetermined threshold value, the synthesizing unit 130 generates the third flow line information. Thus, the flow line synthesis device 100 is able to accurately synthesize the first flow line information and the second flow line information associated with a same target.

Further, the synthesizing unit 130 may confirm whether or not a combination of first additional information and second additional information included in the third flow line information satisfies another predetermined condition, and cause the display device 400 to display a screen based on a result of the confirmation. For example, when there is an obvious discrepancy in a combination of first additional information and second additional information, the synthesizing unit 130 may cause the display device 400 or the like to display a screen (e.g., an error screen) indicating the discrepancy. For example, when first additional information is "thirties" in terms of age, and second additional information is an age "twenty-five years old", there occurs a discrepancy between the first additional information and the second additional information. In such a case, the synthesizing unit 130 may cause the display device 400 to display an error screen.

Further, when overlapping of trajectories determined by the determination unit 120 exceeds a predetermined threshold value, and when a distance, at a certain point of time, between a first position included in a trajectory represented by the first flow line information and a second position included in a trajectory represented by the second flow line information is equal to or smaller than a predetermined distance, the synthesizing unit 130 may synthesize the first flow line information and the second flow line information. Even when overlapping of trajectories determined by the determination unit 120 exceeds a predetermined threshold value, as far as a distance between a first position and a second position at a certain point of time (e.g., a point of time when the first flow line and the second flow line are later than the point of time t5 illustrated in FIG. 5) is larger than a predetermined distance, a possibility that a person associated with the first flow line information, and a person associated with the second flow line information are different persons is high. Therefore, the synthesizing unit 130 may generate, as a predetermined condition, the third flow line information, when overlapping of positions exceeds a predetermined threshold value, and a distance between a first position and a second position at a certain point of time is equal to or smaller than a predetermined distance.

First Modification Example

Flow lines illustrated in FIGS. 5 to 7 are not interrupted. However, as described in PTL 3, for example, a flow line having an interruption may be present. The present modification example describes an example of a case where the flow lines having an interrupted zone are acquired.

Figure 12:
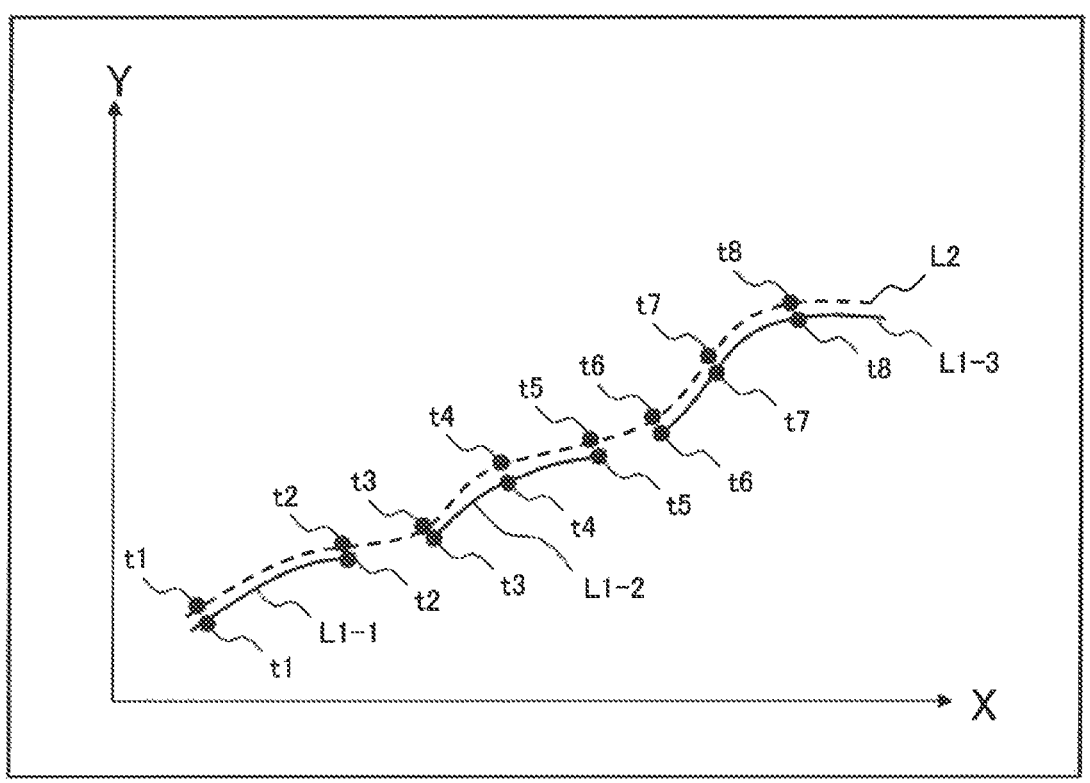
FIG. 12 is a diagram illustrating an example, when first flow line information and second flow line information are plotted on an XY coordinate plane.

FIG. 12 is a diagram illustrating an example of a case where the first flow line information and the second flow line information acquired by an acquisition unit 110 are plotted on an XY-coordinate plane. Similarly to FIG. 5, in FIG. 12, a horizontal axis is an X-axis, and a vertical axis is a Y-axis. Further, in FIG. 12, first flow lines L1-1 to L1-3 are indicated by solid lines, and a second flow line L2 is indicated by a broken line.

The first flow line L1-1 represents a trajectory of positions determined from data generated by a first generation device 200 during a period from a point of time t1 to a point of time t2. The acquisition unit 110 acquires the first flow line information representing the first flow line L1-1. Further, the first flow line L1-2 represents a trajectory of positions determined from data generated by the first generation device 200 during a period from a point of time t3 to a point of time t5. The acquisition unit 110 acquires the first flow line information representing the first flow line L1-2. Further, the first flow line L1-3 represents a trajectory of positions determined from data generated by the first generation device 200 at a point of time after a point of time t6. The acquisition unit 110 acquires the first flow line information representing the first flow line L1-3. In this way, the acquisition unit 110 acquires a plurality of pieces of the first flow line information respectively representing the first flow lines (L1-1 to L1-3). It is not determined whether a target associated with each of the plurality of pieces of the first flow line information is a same person.

Similarly to the above-described second example embodiment, a determination unit 120 in the present modification example determines overlapping of trajectories of the first flow line information and the second flow line information. Thus, it is determined that the first flow line L1-1 and the second flow line L2 overlap each other. Likewise, it is determined that the first flow line L1-2 and the second flow line L2 overlap each other. Further, it is determined that the first flow line L1-3 and the second flow line L2 overlap each other. Note that a result of determination on overlapping may be expressed in terms of a degree of overlapping at a point of time when overlapping occurs, as described above.

Figure 13:
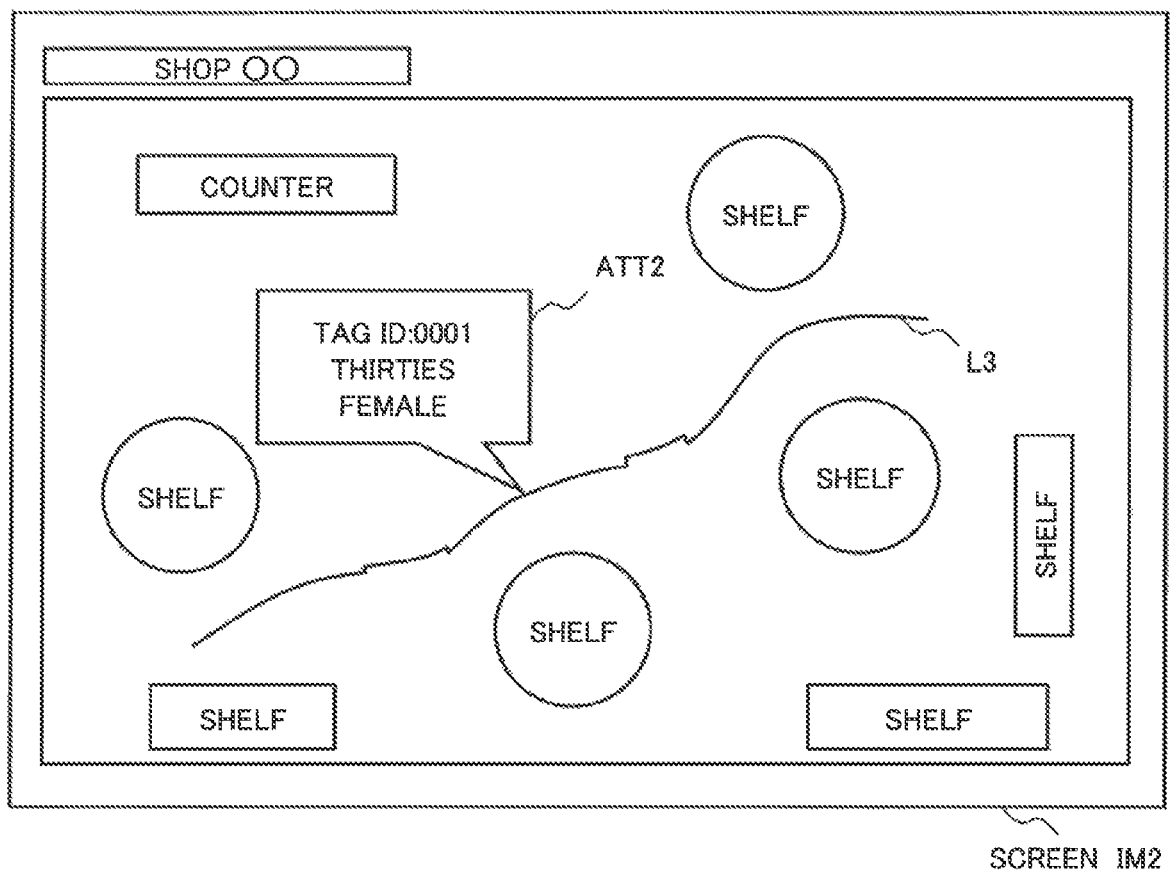
FIG. 13 is a diagram illustrating an example of a screen, when a third flow line represented by third flow line information, which is acquired by synthesizing the first flow line information and the second flow line information illustrated in FIG. 12, is displayed on a screen.

A synthesizing unit 130 generates the third flow line information, which is acquired by synthesizing first flow line information representing the first flow line L1-1, first flow line information representing the first flow line L1-2, first flow line information representing the first flow line L1-3, and second flow line information representing the second flow line L2. FIG. 13 illustrates an example of a screen IM2, when a third flow line L3 represented by the third flow line information, which is acquired by synthesizing the first flow line information and the second flow line information illustrated in FIG. 12 is displayed on a screen. The screen IM2 illustrated in FIG. 13 is a screen to be displayed by a display device 400.

As illustrated in FIG. 13, the third flow line L3 representing third flow line information, which is acquired by synthesizing first flow line information representing a first flow line L1-1, first flow line information representing a first flow line L1-2, first flow line information representing a first flow line L1-3, and second flow line information representing a second flow line L2, is displayed on the screen IM2. Similarly to the example illustrated in FIG. 10, it is assumed that the example illustrated in FIG. 13 is such that attributes included in first additional information are "thirties" and "female", and an attribute included in second additional information is "tag ID:0001". First additional information is included in each of the first flow line information representing the first flow line L1-1, the first flow line information representing the first flow line L1-2, and the first flow line information representing the first flow line L1-3. The synthesizing unit 130 may determine overlapping of attributes of additional information included in the third flow line information (in a case of this example, "thirties" and "female"), and prevent attributes from overlapping each other, and being included in the third flow line information as additional information. Thus, the display device 400 is able to display, on the screen IM2, additional information ATT2 including "tag ID:0001", "thirties", and "female" in association with the third flow line L3 represented by the third flow line information, as illustrated in FIG. 13.

Thus, it is clear that a target associated with each of the first flow lines (L1-1 to L1-3) is a same person. In other words, it is clear that the first flow lines are interrupted. Therefore, the synthesizing unit 130 may generate one first flow line information in which an interruption between the first flow lines is interpolated, based on the generated third flow line information. Note that the synthesizing unit 130 may interpolate, based on the third flow line information, also when the second flow line includes an interrupted zone.

Figure 14:
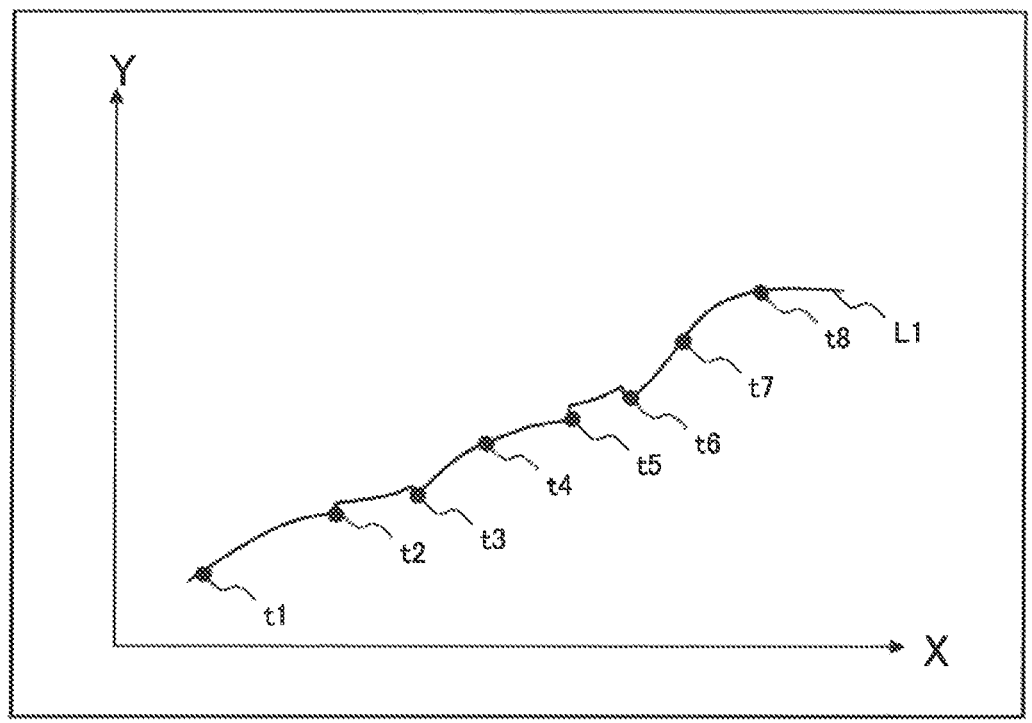
FIG. 14 is a diagram illustrating an example of a first flow line L1 acquired by interpolating an interrupted zone, based on third flow line information.

FIG. 14 is a diagram illustrating an example of the first flow line L1 in which an interrupted zone is interpolated based on the third flow line information. In FIG. 14, a horizontal axis is an X-axis, and a vertical axis is a Y-axis. As illustrated in FIG. 14, the first flow line L1 is acquired by connecting the first flow lines L1-1, L1-2, and L1-3 illustrated in FIG. 12. A flow line of a zone (a period from a point of time t2 to a point of time t3, a period from a point of time t5 to a point of time t6) where the first flow line information is not acquired is interpolated by the third flow line L3. In this way, the synthesizing unit 130 may generate flow line information (e.g., flow line information representing the first flow line L1 illustrated in FIG. 14) in which a plurality of pieces of the first flow line information are connected to one another, based on the third flow line information. Thus, the flow line synthesis device 100 is able to generate the flow line without an interruption.

Second Modification Example

As described above, the first generation device 200 and the second generation device 300 each may be a plurality of devices. Therefore, the flow line synthesis device 100 is able to acquire another flow line information, which is different from the first flow line information and the second flow line information. The present modification example describes an example of a case where three types of pieces of flow line information are generated. In the present modification example, it is assumed that a first generation device 200 is a monitor camera, a second generation device 300 is a device employing an RFID, and another second generation device 300 is a device for acquiring a position by using a method different from a method used in the first generation device 200 and the second generation device 300. At this occasion, flow line information to be acquired from said another second generation device 300 by the flow line synthesis device 100 is referred to as another flow line information. Note that said another flow line information may be flow line information whose position is determined by a method different from a method used in the first flow line information and the second flow line information, and that said another flow line information may be flow line information generated based on data to be generated by the first generation device 200 and the second generation device 300. In other words, said another second generation device 300 may be a same device as the flow line synthesis device 100 and the first generation device 200.

Figure 15:
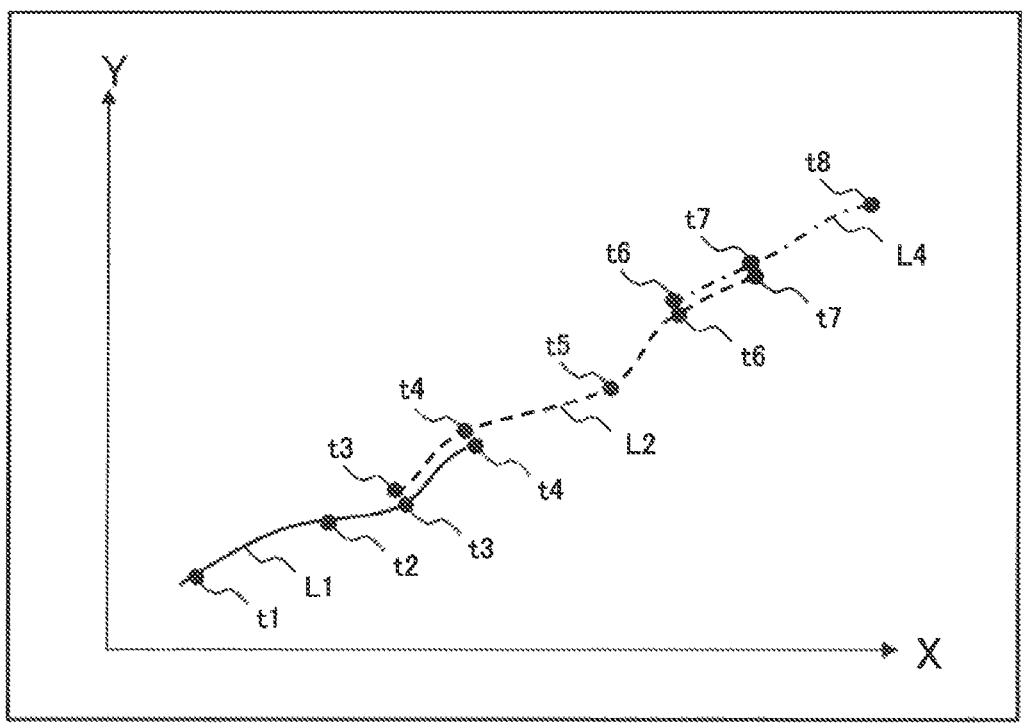
FIG. 15 is a diagram illustrating an example, when first flow line information, second flow line information, and another flow line information are plotted on an XY coordinate plane.

FIG. 15 is a diagram illustrating an example of a case where first flow line information, second flow line information, and another flow line information acquired by an acquisition unit 110 are plotted on an XY-coordinate plane. In FIG. 15, a horizontal axis is an X-axis, and a vertical axis is a Y-axis. Further, in FIG. 15, a first flow line L1 is indicated by a solid line, and a second flow line L2 is indicated by a broken line, and another flow line L4 represented by said another flow line information is indicated by a one-dotted chain line.

Similarly to the above-described second example embodiment, a determination unit 120 in the present modification embodiment determines overlapping of trajectories of the first flow line information and the second flow line information. Thus, it is determined that the first flow line L1 and the second flow line L2 overlap each other. Further, the determination unit 120 determines overlapping of trajectories of the first flow line information and said another flow line information. As illustrated in FIG. 15, since the first flow line L1 and said another flow line L4 do not overlap each other, the determination unit 120 determines that the first flow line information and said another flow line information do not overlap each other. Further, the determination unit 120 determines overlapping of trajectories of the second flow line information and said another flow line information. Thus, it is determined that the second flow line L2 and said another flow line L4 overlap each other. Note that, as described above, a result of determination on overlapping may be expressed in terms of a degree of overlapping at a point of time when overlapping occurs.

Figure 16:
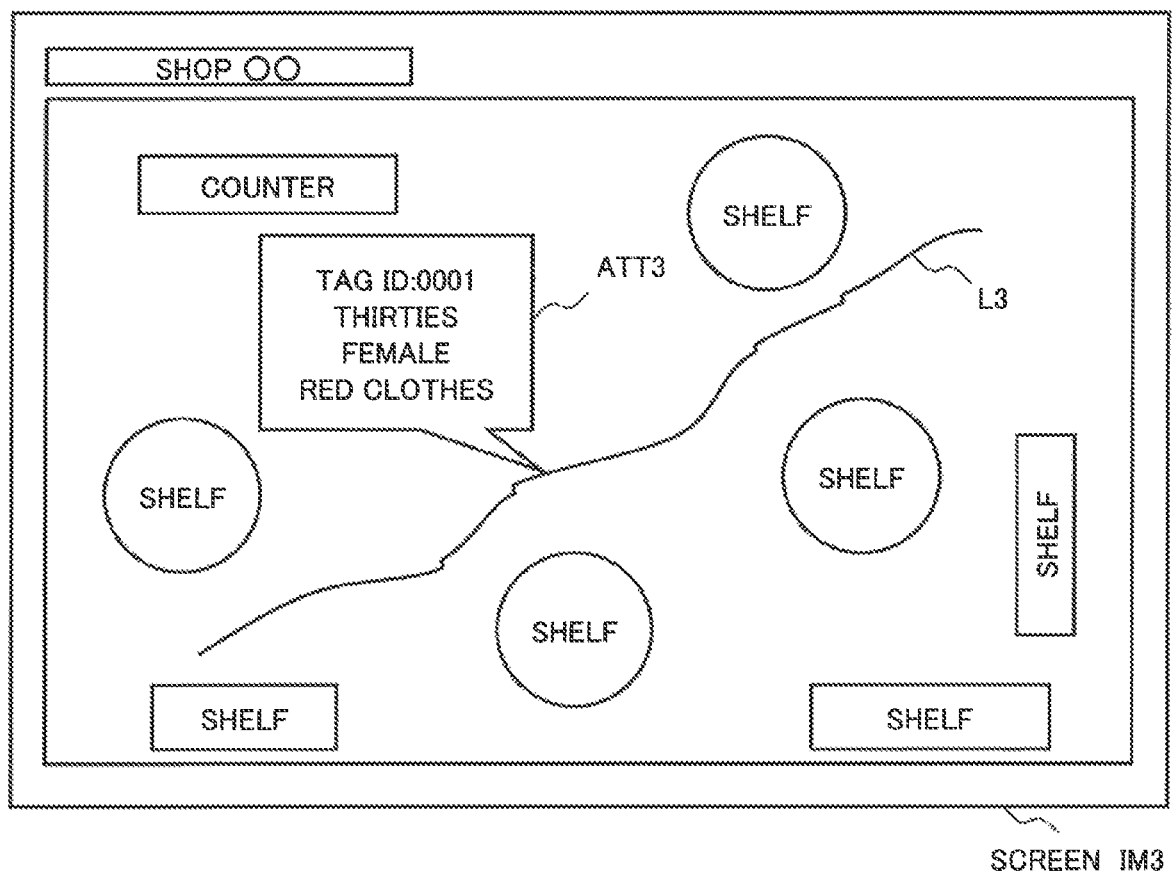
FIG. 16 is a diagram illustrating an example of a screen, when a third flow line represented by third flow line information, which is acquired by synthesizing the first flow line information, the second flow line information, and the another flow line information illustrated in FIG. 15, is displayed on a screen.

As described above, although the first flow line L1 represented by the first flow line information and said another flow line L4 represented by said another flow line information do not overlap each other, the first flow line L1 and the another flow line L4 respectively overlap with the second flow line L2. Therefore, it is clear that a target associated with the first flow line information, the second flow line information, and said another flow line information is a same person. The synthesizing unit 130 generates the third flow line information, which is acquired by synthesizing the first flow line information representing the first flow line L1, the second flow line information representing the second flow line L2, and said another flow line information representing the another flow line L4. FIG. 16 illustrates an example of a screen, when the third flow line represented by the third flow line information, which is acquired by synthesizing the first flow line information, the second flow line information, and said another flow line information illustrated in FIG. 15, is displayed on a screen. A screen IM3 illustrated in FIG. 16 is a screen to be displayed by a display device 400.

As illustrated in FIG. 16, a third flow line L3 represented by the third flow line information, which is acquired by synthesizing the first flow line information representing the first flow line L1, the second flow line information representing the second flow line L2, and said another flow line information representing the another flow line L4 is displayed on the screen IM3. In the example illustrated in FIG. 16, it is assumed that attributes included in first additional information are "thirties" and "female", and an attribute included in second additional information is "tag ID:0001", and an attribute included in additional information (referred to as another additional information) included in said another flow line information is "red clothes". The synthesizing unit 130 generates the third flow line information including first additional information, second additional information, and another additional information. Thus, as illustrated in FIG. 16, the display device 400 is able to display, on the screen IM3, additional information ATT3 including "tag ID: 0001", "thirties", "female", and "red clothes" in association with the third flow line L3 represented by the third flow line information.

Third Modification Example

The above-described example describes that the acquisition unit 110 acquires one flow line information from the first generation device 200 or the second generation device 300. However, for example, when two persons are present close to each other at a certain point of time, an acquisition unit 110 acquires two pieces of the first flow line information or two pieces of the second flow line information. In the present modification example, processing of a flow line synthesis device 100 in such a case is described.

In the present modification example, similarly to the above-described second modification example, for example, it is assumed that a first generation device 200 is a monitor camera, a second generation device 300 is a device employing an RFID, and another second generation device 300 is a device for acquiring a position by using a method different from a method used in the first generation device 200 and the second generation device 300. Another second generation device 300 in the present modification example is similar to the another second generation device 300 described in the second modification example.

Figure 17:
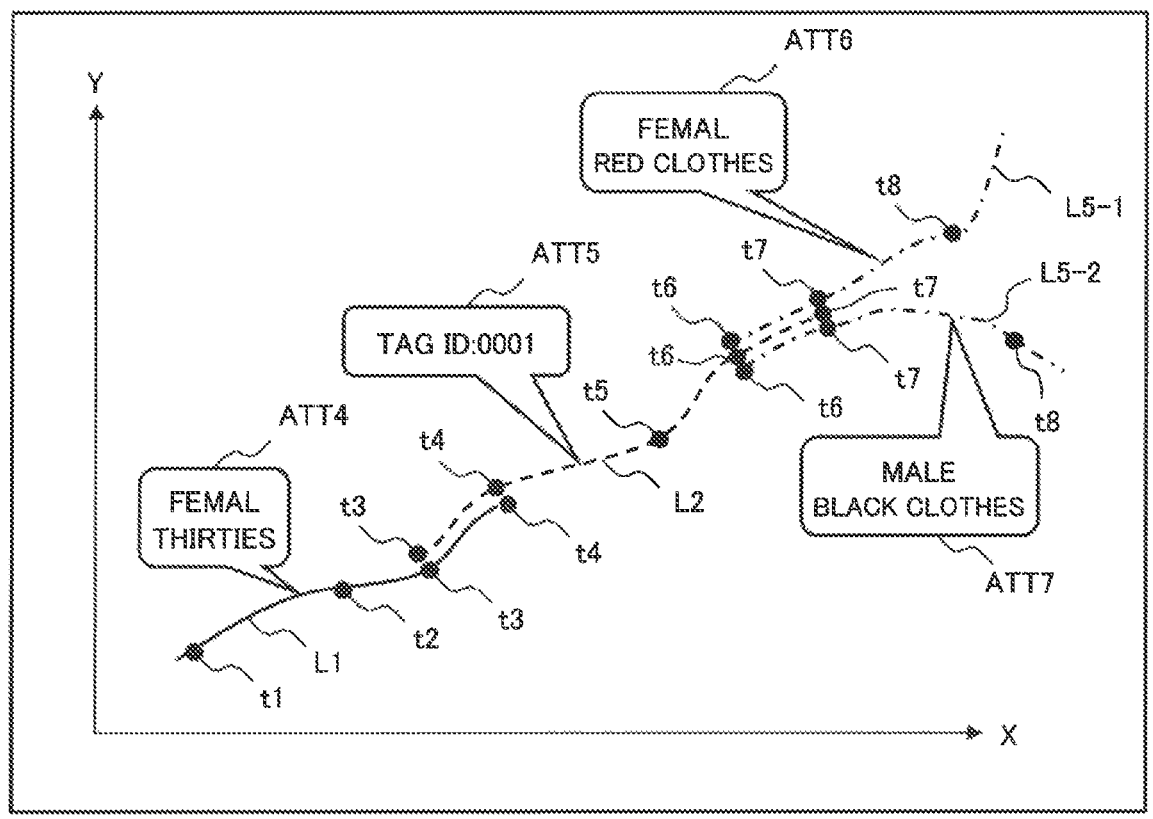
FIG. 17 is a diagram illustrating an example, when first flow line information, second flow line information, and another flow line information are plotted on an XY coordinate plane.

FIG. 17 is a diagram illustrating an example of a case where the first flow line information, the second flow line information, and other flow line information acquired by an acquisition unit 110 are plotted on an XY-coordinate plane. In FIG. 17, a horizontal axis is an X-axis, and a vertical axis is a Y-axis. Further, in FIG. 17, a first flow line L1 is indicated by a solid line, a second flow line L2 is indicated by a broken line, and other flow lines L5-1 and L5-2 represented by other flow line information are indicated by one-dotted chain lines.

Another second generation device 300 determines a position included in the other flow line L5-1 and a position included in the other flow line L5-2. Therefore, the acquisition unit 110 acquires flow line information representing the other flow line L5-1 and flow line information representing the other flow line L5-2, which are output from the another second generation device 300.

Herein, it is assumed that first flow line information representing the first flow line L1 includes first additional information ATT4 having attributes "thirties" and "female", and second flow line information representing the second flow line L2 includes second additional information ATT5 having an attribute "tag ID:0001". Further, the other flow line information representing the other flow line L5-1 includes other additional information ATT6 having attributes "female" and "red clothes", and the other flow line information representing the other flow line L5-2 includes other additional information ATT7 having attributes "male" and "black clothes".

Similarly to the above-described second example embodiment, a determination unit 120 in the present modification example determines overlapping of trajectories of the first flow line information and the second flow line information. Thus, it is determined that the first flow line L1 and the second flow line L2 overlap each other. Further, the determination unit 120 determines overlapping of the second flow line information representing the second flow line L2 and other flow line information representing the other flow line L5-1 or the other flow line L5-2. As illustrated in FIG. 17, both of the second flow line L2 and the other flow line L5-1, and the second flow line L2 and the other flow line L5-2 overlap each other during a period from a point of time t6 to a point of time t7.

In this case, an attribute included in additional information is used for overlap determination, in addition to a position and a point of time. As illustrated in FIG. 17, the second additional information ATT5, and the other additional information ATT6 or the other additional information ATT7 do not include a same attribute.

However, as described above, the second flow line L2 represented by the second flow line information including the second additional information ATT5 overlaps with the first flow line L1 represented by the first flow line information. Therefore, the determination unit 120 compares an attribute included in each of the first additional information ATT4 and the second additional information ATT5, which are included in the third flow line information to be generated by the synthesizing unit 130, and an attribute included in the other additional information ATT6 or an attribute included in the other additional information ATT7.

For example, the determination unit 120 may receive, from the synthesizing unit 130, the third flow line information acquired by synthesizing the first flow line information and the second flow line information; and compare an attribute included in additional information, which is included in the third flow line information, and an attribute included in the other additional information ATT6 or an attribute included in the other additional information ATT7. Further, the determination unit 120 may compare, based on a result of determination on overlapping of trajectories of the first flow line information and the second flow line information from the synthesizing unit 130, an attribute included in each of the first flow information and the second flow line information, which are included in the third flow line information, and an attribute included in the other additional information ATT6 or an attribute included in the other additional information ATT7.

Then, the determination unit 120 determines overlapping of the second flow line L2, and the other flow line L5-1 or the other flow line L5-2 where a position and a point of time overlap, based on a result of comparison.

Since both of the first additional information ATT4 and the other additional information ATT6 include an attribute "female", a flow line of a same person as a target of the first flow line L1 and the second flow line L2 is determined to be the other flow line L5-1. The synthesizing unit 130 generates third flow line information, which is acquired by synthesizing the first flow line information representing the first flow line L1, second flow line information representing the second flow line L2, and other flow line information representing the other flow line L5-1, based on a result of the determination.

Figure 18:
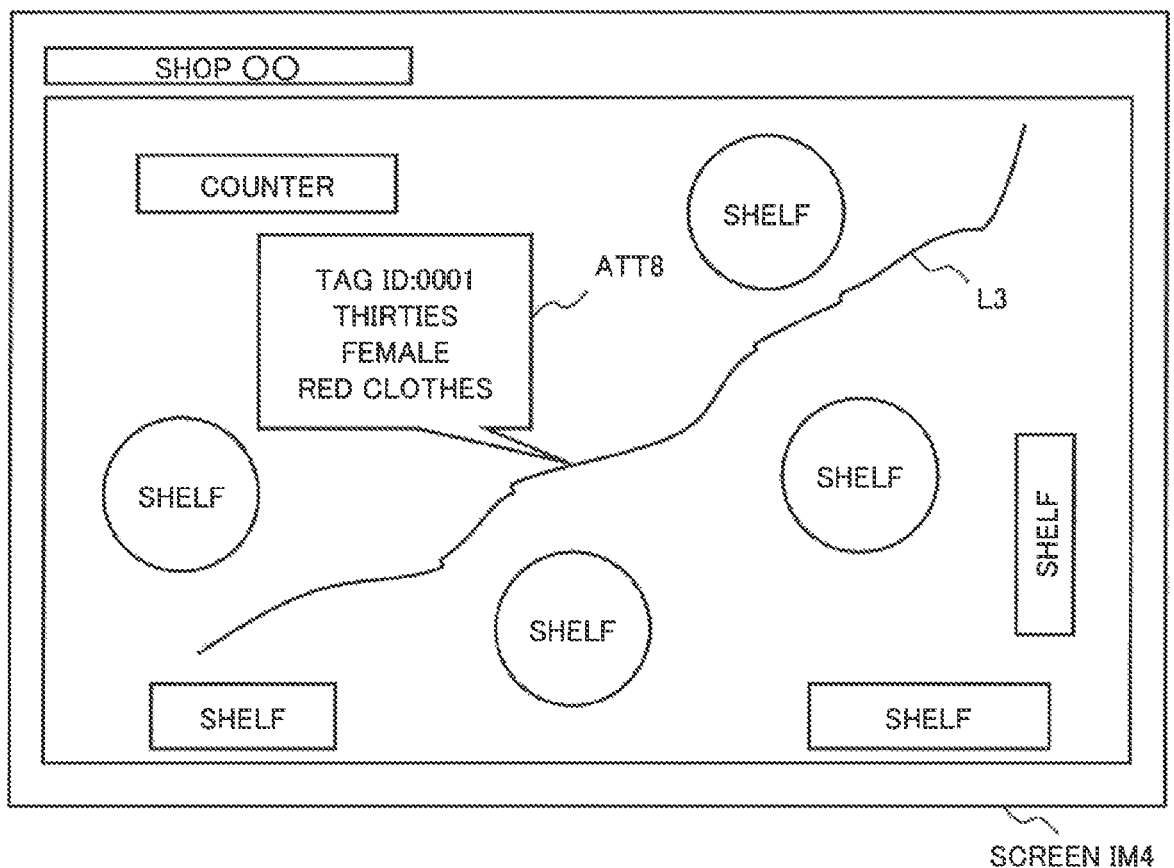
FIG. 18 is a diagram illustrating an example of a screen, when a third flow line represented by third flow line information, which is acquired by synthesizing the first flow line information, the second flow line information, and the another flow line information illustrated in FIG. 17, is displayed on a screen.

FIG. 18 illustrates an example of a screen, when a third flow line represented by the third flow line information, which is acquired by synthesizing the first flow line information, the second flow line information, and other flow line information illustrated in FIG. 17, is displayed on a screen. A screen IM4 illustrated in FIG. 18 is a screen to be displayed by a display device 400.

As illustrated in FIG. 18, a third flow line L3 represented by the third flow line information, which is acquired by synthesizing the first flow line information representing the first flow line L1, the second flow line information representing the second flow line L2, and other flow line information representing other flow line L5-1, is displayed on the screen IM4. The synthesizing unit 130 generates the third flow line information including first additional information ATT4, second additional information ATT5, and other additional information ATT6. In the example illustrated in FIG. 18, as described above, attributes included in the first additional information ATT4 are "thirties" and "female", and an attribute included in the second additional information ATT5 is "tag ID:0001". Further, attributes included in the other additional information ATT6 included in other flow line information representing the other flow line L5-1 are "female" and "red clothes". Therefore, as illustrated in FIG. 18, additional information ATT8 including "tag ID: 0001", "thirties", "female", and "red clothes" is displayed in association with the third flow line L3 represented by the third flow line information on the screen IM4 to be displayed by the display device 400.

Note that, in the above-described example, although pieces of flow line information in which a position and a point of time overlap do not include additional information having a same attribute, there is a case that the pieces of the flow line information in which a position and a point of time overlap include additional information having a same attribute. For example, when an attribute "red clothes" is included in the second additional information, the determination unit 120 may determine overlapping of trajectories of the second flow line information and other flow line information by using a position, a point of time, and the attribute "red clothes". Thus, the determination unit 120 is able to determine that a target of the second flow line L2 is a same person as a target of the other flow line L5-1.

In this way, the determination unit 120 according to the present modification example may determine overlapping by comparing first additional information and second additional information. Thus, the flow line synthesis device 100 is able to generate accurate flow line information.

Fourth Modification Example

Figure 19:
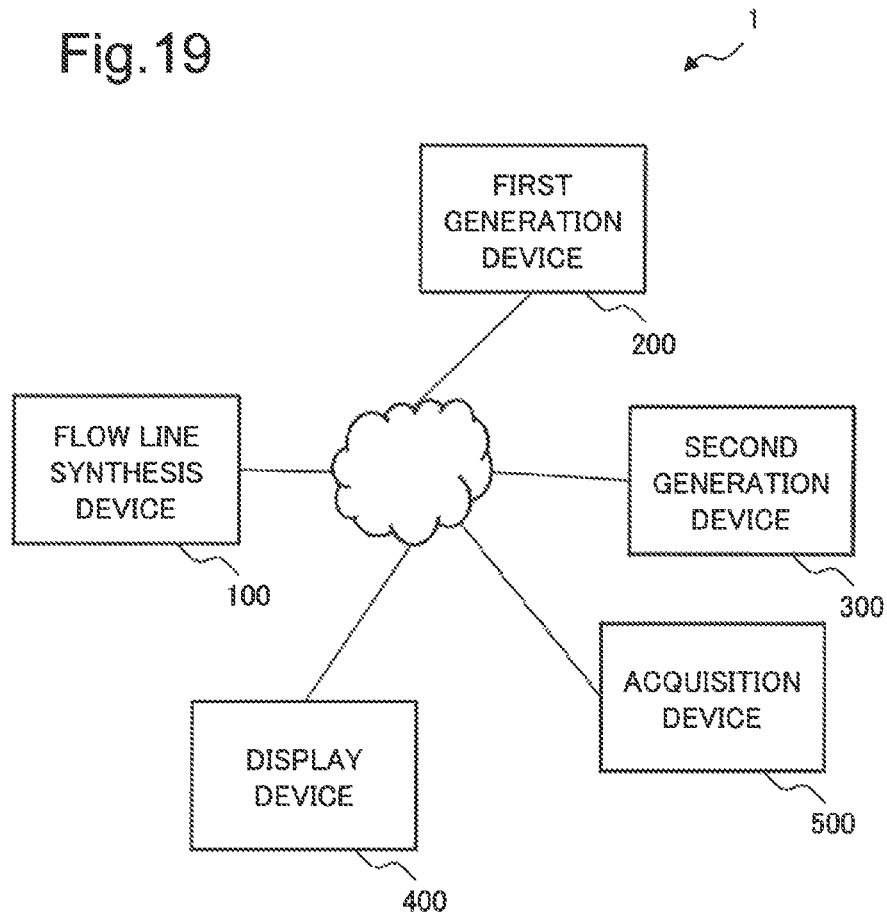
FIG. 19 is a block diagram illustrating an example of a configuration of a flow line synthesis system according to a fourth modification example.

The present modification example describes a configuration in which the flow line synthesis system 1 includes an acquisition device 500. FIG. 19 is a block diagram illustrating an example of a configuration of the flow line synthesis system 1 according to the present modification example. The flow line synthesis system 1 according to the present modification example includes a flow line synthesis device 100, a first generation device 200, a second generation device 300, a display device 400, and the acquisition device 500. Note that the acquisition device 500 may be a plurality of devices.

The acquisition device 500 acquires information (referred to as third additional information), which is associated with a position and a person determined at the position. The acquisition device 500 may be a device having a function of extracting a facial feature from a photographed image, as an attribute of the third additional information, for example. In this case, when the flow line synthesis device 100 has a function of extracting a facial feature, the acquisition device 500 may photograph an image, and transmit the photographed image to the flow line synthesis device 100. When the acquisition device 500 acquires the third additional information, the acquisition device 500 associates a position of a person, the third additional information, and a point of time when data (in the above-described case, an image) from which the third additional information is extracted are generated with one another, and supplies the associated information to the flow line synthesis device 100. Note that the acquisition device 500 may store the third additional information in a storage device accessible by the flow line synthesis device 100.

An acquisition unit 110 of the flow line synthesis device 100 acquires the third additional information. Then, a determination unit 120 determines whether or not a target is a same person by comparing a position (referred to as a third position), which is associated with the third additional information and a point of time, and a position and a point of time at the position, which are included in each of the first flow line information and/or the second flow line information. The determination unit 120 compares a first position and a second position determined from generated data, and a third position at a point of time within a predetermined period from a point of time associated with the third additional information, for example. Thus, the determination unit 120 determines whether or not a person whose trajectory is represented by the first flow line information and/or the second flow line information is same as a person having the third additional information. The determination unit 120 supplies a determination result to a synthesizing unit 130.

Then, when the person associated with the third additional information is a target associated with the first flow line information and the second flow line information, the synthesizing unit 130 generates third flow line information including the third additional information.

Such an operation of the flow line synthesis system 1 in the present modification example is further described with reference to FIGS. 20 and 21.

Figure 20:
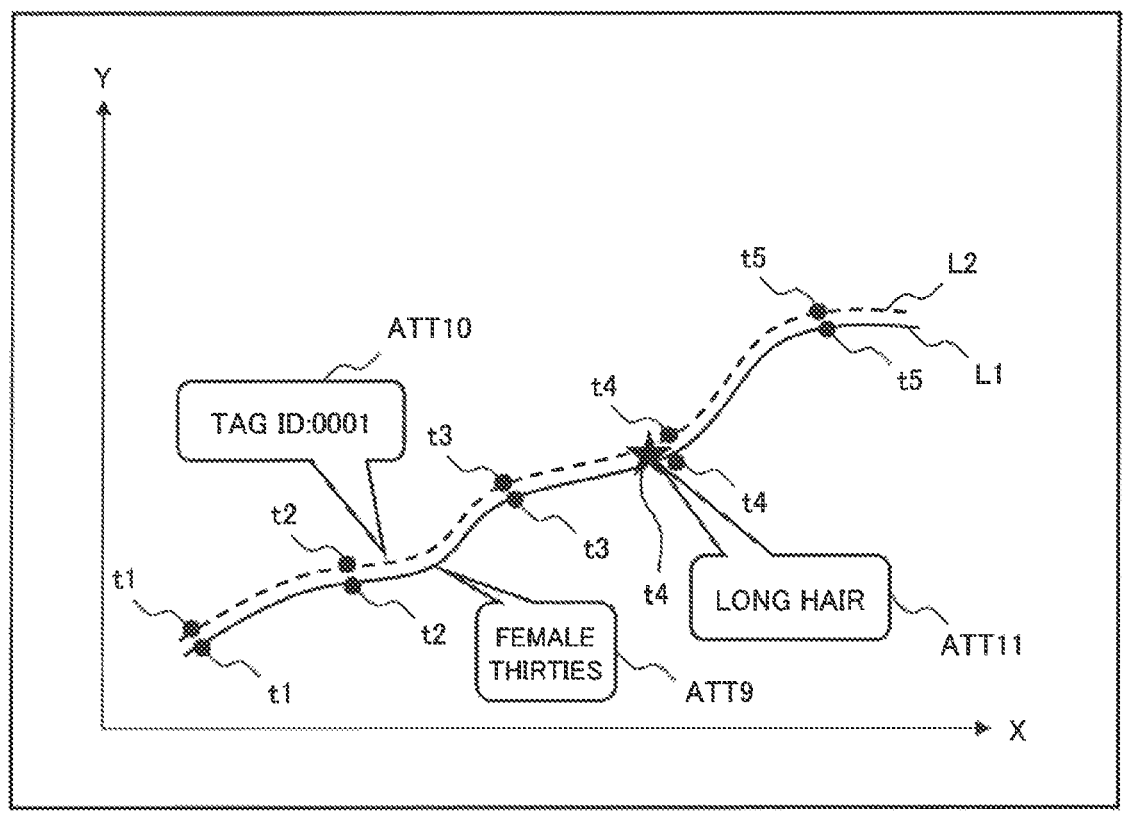
FIG. 20 is a diagram illustrating an example, when first flow line information, second flow line information, and positions of a person having third additional information are plotted on an XY coordinate plane.

FIG. 20 is a diagram illustrating an example of a case where the first flow line information, the second flow line information, and a position of the person having the third additional information, which are acquired by the acquisition unit 110, are plotted on an XY-coordinate plane. In FIG. 20, a horizontal axis is an X-axis, and a vertical axis is a Y-axis. Further, in FIG. 20, a first flow line L1 is indicated by a solid line, and a second flow line L2 is indicated by a broken line. Further, a position of the person having the third additional information is indicated by a star mark. Further, it is assumed that a point of time associated with third additional information is a point of time t4.

Herein, as illustrated in FIG. 20, it is assumed that the first flow line information representing the first flow line L1 includes first additional information ATT9 having attributes "thirties" and "female", and the second flow line information representing the second flow line L2 includes second additional information ATT10 having an attribute "tag ID:0001". Further, it is assumed that the third additional information ATT11 includes an attribute "long hair".

The determination unit 120 in the present modification example determines whether or not a target of the first flow line information and/or the second flow line information is a same person as a person having the third additional information by comparing a first position and a second position at the point of time t4, and a third position. In a case of the example illustrated in FIG. 20, a person having the third additional information is determined to be a same person as a target of the first flow line information and/or the second flow line information. Then, the synthesizing unit 130 generates third flow line information including the first additional information ATT9, the second additional information ATT10, and the third additional information ATT11.

Figure 21:
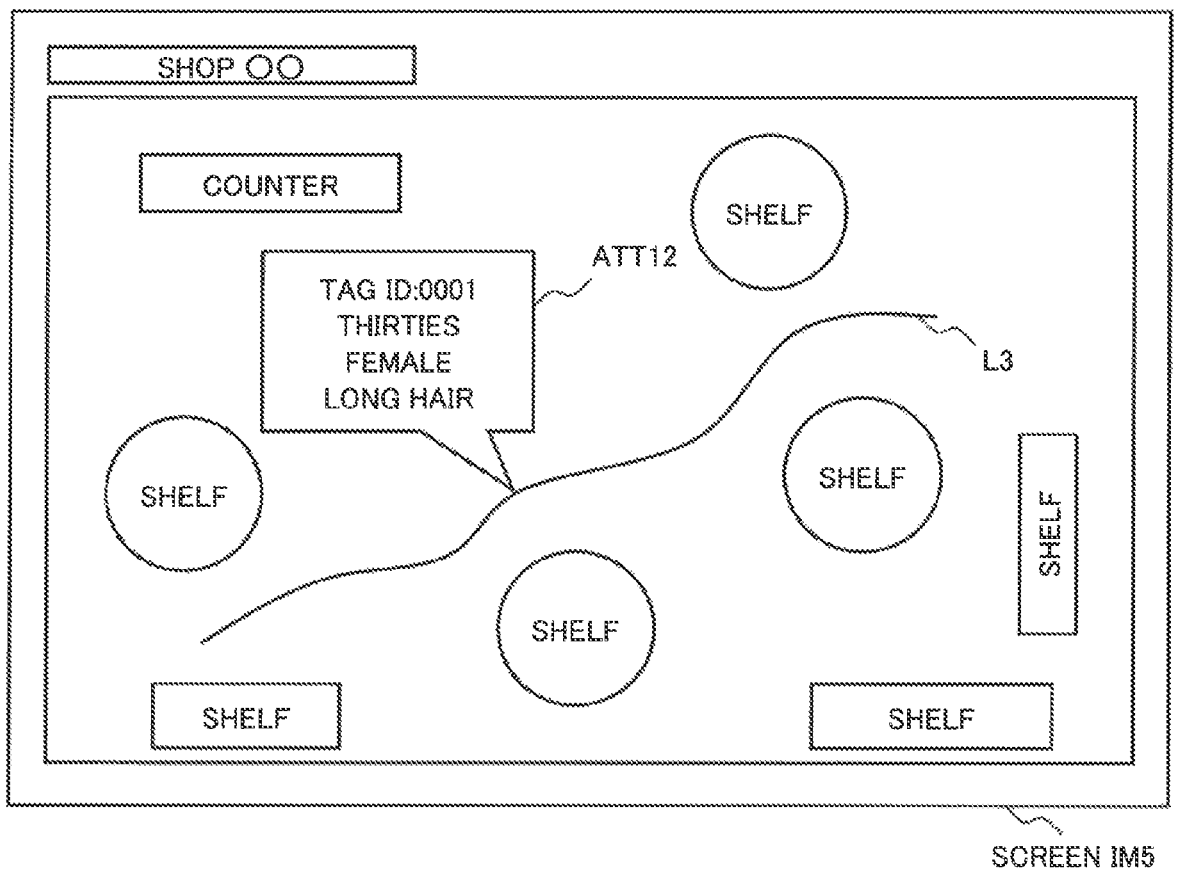
FIG. 21 is a diagram illustrating an example of a screen, when a third flow line represented by third flow line information, which is acquired by synthesizing the first flow line information and the second flow line information illustrated in FIG. 20, is displayed on a screen.

FIG. 21 illustrates an example of a screen IM5, when a third flow line L3 represented by the third flow line information, which is acquired by synthesizing the first flow line information and the second flow line information illustrated in FIG. 20 is displayed on a screen. The screen IM5 illustrated in FIG. 21 is a screen to be displayed by the display device 400.

As illustrated in FIG. 21, the third flow line L3 represented by the third flow line information, which is acquired by synthesizing the first flow line information representing the first flow line L1 and the second flow line information representing the second flow line L2, is displayed on the screen IM5. The third flow line information representing the third flow line L3 includes the first additional information ATT9, the second additional information ATT10, and the third additional information ATT11. Therefore, as illustrated in FIG. 21, the display device 400 is able to display, on the screen IM5, additional information ATT12 including "tag ID: 0001", "thirties", "female", and "long hair" in association with the third flow line L3 represented by the third flow line information.

Note that the third additional information may include operation information representing an operation at a certain position, for example. The operation information may be data (e.g., a set of three-dimensional coordinates), which express a three-dimensional operation of a person, or may be information representing a type of operation. Information representing a type of operation may be a word expressing a specific operation, which is specified by comparing data expressing a three-dimensional operation of a person, and a pattern for identifying a type of operation. For example, it is assumed that a person performs an operation of waving his/her hand. At this occasion, operation information may be a set of coordinate values representing a position of the hand, or may be a word expressing an operation "waving his/her hand".

Further, the determination unit 120 may determine whether or not a target is a same person by comparing a third position and a point of time, and a position included in the third flow line information and a point of time at the position. Then, the synthesizing unit 130 may include the third additional information in the third flow line information, based on a determination result.

Further, the synthesizing unit 130 may confirm whether or not a combination of the first additional information, the second additional information, and the third additional information satisfies another predetermined condition, and cause the display device 400 to display a screen based on a result of the confirmation. For example, when there is an obvious discrepancy in a combination of the first additional information, the second additional information, and the third additional information, the synthesizing unit 130 may cause the display device 400 or the like to display a screen (e.g., an error screen) indicating the discrepancy.

In this way, the flow line synthesis system 1 in the present modification example further includes the acquisition device 500. Thus, the acquisition unit 110 acquires the third additional information associated with a target whose third position is determined by the acquisition device 500. Then, the determination unit 120 determines whether or not a person associated with the third additional information is a person associated with the first flow line information and the second flow line information by comparing a third position and a point of time at the third position, and a first position and a point of time at the first position, and/or a second position and a point of time at the second position. Then, when a person associated with the third additional information is a target associated with the first flow line information and the second flow line information, the synthesizing unit 130 generates third flow line information including the third additional information.

Thus, the flow line synthesis device 100 is able to include information on a target in flow line information, in addition to an advantageous effect in the above-described second example embodiment. Therefore, the flow line synthesis device 100 in the present modification example is able to further enhance an added value of the flow line information.

Note that, similarly to the another second generation device 300 described in the second modification example, the acquisition device 500 may be a same device as the first generation device 200 and the second generation device 300. In this case, a position associated with the third additional information may be determined by a method different from a method for the first flow line information and the second flow line information. A position associated with the third additional information may be determined based on data to be generated by the first generation device 200 and the second generation device 300.

(Regarding Hardware Configuration)

In each example embodiment of the present disclosure, each constituent element of each device indicates a block in terms of a functional unit. A part or the entirety of each constituent element of each device is implemented by any combination of an information processing device 900 and a program as illustrated in FIG. 22, for example. FIG. 22 is a block diagram illustrating an example of a hardware configuration of the information processing device 900 for implementing each constituent element of each device. The information processing device 900 includes the following configuration, as one example.

- a Central Processing Unit (CPU) 901
- a Read Only Memory (ROM) 902
- a Random Access Memory (RAM) 903
- a program 904 to be loaded in the RAM 903
- a storage device 905 for storing the program 904
- a drive device 907 for reading and writing with respect to a recording medium 906
- a communication interface 908 to be connected to a communication network 909
- an input-output interface 910 for inputting and outputting data
- a bus 911 for connecting constituent elements Each constituent element of each device in each example embodiment is implemented by causing the CPU 901 to acquire and execute the program 904 for implementing these functions. The program 904 for implementing a function of each constituent element of each device is stored in advance in the storage device 905 or the ROM 902, for example, and the CPU 901 reads the program 904 as necessary. Note that the program 904 may be supplied to the CPU 901 via the communication network 909, or may be stored in advance in the recording medium 906, or the drive device 907 may read the program and supply the program to the CPU 901.

Various modification examples are applied in a method for implementing each device. For example, each device may be implemented by any combination of an individual information processing device 900 and a program for each constituent element. Further, a plurality of constituent elements included in each device may be implemented by any combination of one information processing device 900 and a program.

Further, a part or the entirety of each constituent element of each device may be implemented by another general-purpose or dedicated circuit, a processor, or the like, or a combination of these elements. These elements may be constituted by a single chip, or may be constituted by a plurality of chips to be connected via a bus.

A part or the entirety of each constituent element of each device may be implemented by a combination of the above-described circuit or the like, and a program.

When a part or the entirety of each constituent element of each device is implemented by a plurality of information processing devices, circuits, or the like, the plurality of information processing devices, circuits, or the like may be concentratedly disposed or distributedly disposed. For example, an information processing device, a circuit, or the like may be implemented as a configuration in which each of a client-and-server system, a cloud computing system, and the like is connected via a communication network.

Note that the above-described example embodiments are preferred example embodiments of the present disclosure, and the scope of the present disclosure is not limited only to the above-described example embodiments. A person skilled in the art may revise or substitute the above-described example embodiments, as far as the revision or substitution does not depart from the gist of the present disclosure, and configure an example embodiment to which various modifications are applied.

A part or the entirety of the above-described example embodiments may be described as the following supplementary notes, but are not limited to the following.

(Supplementary Note 1)

A flow line synthesis device comprising:
  acquisition means for acquiring first flow line information representing a trajectory of positions determined by a first method, and second flow line information representing a trajectory of positions determined by a second method different from the first method;
  determination means for determining overlapping of trajectories respectively represented by the acquired first flow line information and the second flow line information; and
  synthesizing means for generating third flow line information which is acquired by synthesizing the first flow line information and the second flow line information, and in which overlapping of trajectories determined by the determination means satisfies a predetermined condition.

(Supplementary Note 2)

The flow line synthesis device according to supplementary note 1, wherein
  the determination means determines the overlapping by comparing a position included in each of the first flow line information and the second flow line information, and a point of time at the position.

(Supplementary Note 3)

The flow line synthesis device according to supplementary note 1 or 2, wherein
  the first flow line information includes first additional information,
  the second flow line information includes second additional information, and
  the third flow line information includes the first additional information and the second additional information.

(Supplementary Note 4)

The flow line synthesis device according to supplementary note 3, wherein the determination means determines the overlapping by comparing the first additional information and the second additional information.

(Supplementary Note 5)

The flow line synthesis device according to supplementary note 3 or 4, wherein the synthesizing means confirms whether or not a combination of the first additional information and the second additional information being included in the third flow line information satisfies another predetermined condition.

(Supplementary Note 6)

The flow line synthesis device according to any one of supplementary notes 1 to 5, wherein the acquisition means acquires third additional information associated with a target whose position is determined by a third method different from the first method and the second method, the determination means determines whether or not the target is associated with the first flow line information and the second flow line information by comparing a position determined by the third method and a point of time at the position, with a position included in at least one of the first flow line information and the second flow line information and a point of time at the position, and the synthesizing means generates the third flow line information including the third additional information, when a target associated with the third additional information is associated with the first flow line information and the second flow line information.

(Supplementary Note 7)

The flow line synthesis device according to any one of supplementary notes 1 to 6, wherein the synthesizing means generates the third flow line information, when a degree of the overlapping exceeds a predetermined threshold value.

(Supplementary Note 8)

The flow line synthesis device according to any one of supplementary notes 1 to 7, wherein the synthesizing means generates flow line information in which a plurality of pieces of the first flow line information are connected to one another, based on the third flow line information, when the third flow line information is synthesized by using a plurality of pieces of the first flow line information.

(Supplementary Note 9)

The flow line synthesis device according to any one of supplementary notes 1 to 8, wherein the synthesizing means causes a display device to display a portion of the trajectories where the trajectories are determined to overlap each other by the determination means among a flow line represented by the third flow line information, in a pattern different from a pattern of another portion.

(Supplementary Note 10)

A flow line synthesis method comprising:

acquiring first flow line information representing a trajectory of positions determined by a first method, and second flow line information representing a trajectory of positions determined by a second method different from the first method;

determining overlapping of trajectories respectively represented by the acquired first flow line information and the second flow line information; and generating third flow line information which is acquired by synthesizing the first flow line information and the second flow line information, and in which determined overlapping of trajectories satisfies a predetermined condition.

(Supplementary Note 11)

The flow line synthesis method according to supplementary note 10, further comprising determining the overlapping by comparing a position included in each of the first flow line information and the second flow line information, and a point of time at the position.

(Supplementary Note 12)

A computer readable non-temporary recording medium having a program recorded therein, the program causing a computer to execute:

processing of acquiring first flow line information representing a trajectory of positions determined by a first method, and second flow line information representing a trajectory of positions determined by a second method different from the first method;

processing of determining overlapping of trajectories respectively represented by the acquired first flow line information and the second flow line information; and processing of generating third flow line information which is acquired by synthesizing the first flow line information and the second flow line information, and in which determined overlapping of trajectories satisfies a predetermined condition.

(Supplementary Note 13)

The recording medium according to supplementary note 12, wherein determining the overlapping by comparing a position included in each of the first flow line information and the second flow line information, and a point of time at the position.

REFERENCE SIGNS LIST

1 Flow line synthesis system
10 Flow line synthesis device
11 Acquisition unit
12 Determination unit
13 Synthesizing unit
100 Flow line synthesis device
110 Acquisition unit
120 Determination unit
130 Synthesizing unit
200 First generation device
300 Second generation device
400 Display device
500 Acquisition device

The invention claimed is:

1. A flow line synthesis device comprising:
at least one memory configured to store instructions; and
at least one processor executing the instructions to perform:
acquiring first flow line information representing a trajectory of a position determined by a first method, wherein the first method is based on an image captured by a camera;

acquiring second flow line information representing a trajectory of a position determined by a second method, wherein the second method is not based on a captured image;

determining overlapping of trajectories respectively represented by the acquired first flow line information and second flow line information;

generating third flow line information which is acquired by synthesizing the first flow line information and the second flow line information, and in which overlapping of trajectories-satisfies a predetermined condition; and causing a display device to display a portion of the trajectories where the trajectories are determined to overlap each other among a flow line represented by the third flow line information, in a pattern different from non-overlapping portions of the flow line represented by the third flow line information.

2. The flow line synthesis device according to claim 1, wherein
the at least one processor performs determining the overlapping by comparing a position included in each of the first flow line information and the second flow line information, and a point of time at the position.

3. The flow line synthesis device according to claim 1, wherein
the first flow line information includes first additional information,
the second flow line information includes second additional information, and
the third flow line information includes the first additional information and the second additional information.

4. The flow line synthesis device according to claim 3, wherein
the at least one processor performs determining to generate the third flow line information by comparing the first additional information and the second additional information.

5. The flow line synthesis device according to claim 3, wherein
the at least one processor performs confirming whether or not a combination of the first additional information and the second additional information being included in the third flow line information satisfies another predetermined condition.

6. The flow line synthesis device according to claim 3, wherein the first additional information indicates any one or any combination of a sex, a generation and clothing.

7. The flow line synthesis device according to claim 3, wherein the second additional information indicates any one or any combination of a sex, a generation and clothing.

8. The flow line synthesis device according to claim 1, wherein
the at least one processor performs to:
acquiring third additional information associated with a target whose position is determined by a third method different from the first method and the second method,
determining whether or not the target is associated with the first flow line information and the second flow line information by comparing a position determined by the third method and a point of time at the position, with a position included in at least one of the first flow line information and the second flow line information and a point of time at the position, and generating the third flow line information including the third additional information, when a target associated with the third additional information is associated with the first flow line information and the second flow line information.

9. The flow line synthesis device according to claim 1, wherein
the at least one processor performs generating the third flow line information, when a degree of the overlapping exceeds a predetermined threshold value.

10. The flow line synthesis device according to claim 1, wherein the second method is based on any one or any combination of radio frequency identification communication, Bluetooth communication, Wi-Fi communication, ZigBee communication, a geomagnetic sensor, a floor pressure sensor, and a global positioning system.

11. A flow line synthesis method comprising:
acquiring first flow line information representing a trajectory of a position determined by a first method, wherein the first method is based on an image captured by a camera;

acquiring second flow line information representing a trajectory of a position determined by a second method, wherein the second method is not based on a captured image;

determining overlapping of trajectories respectively represented by the acquired first flow line information and second flow line information;

generating third flow line information which is acquired by synthesizing the first flow line information and the second flow line information, and in which determined overlapping of trajectories satisfies a predetermined condition; and causing a display device to display a portion of the trajectories where the trajectories are determined to overlap each other among a flow line represented by the third flow line information, in a pattern different from non-overlapping portions of the flow line represented by the third flow line information.

12. The flow line synthesis method according to claim 11, further comprising
determining the overlapping by comparing a position included in each of the first flow line information and the second flow line information, and a point of time at the position.

13. A non-transitory computer readable recording medium having a program recorded therein, the program causing a computer to execute:
processing of acquiring first flow line information representing a trajectory of a position determined by a first method, wherein the first method is based on an image captured by a camera;

acquiring second flow line information representing a trajectory of a position determined by a second method, wherein the second method is not based on a captured image;

processing of determining overlapping of trajectories respectively represented by the acquired first flow line information and second flow line information;

processing of generating third flow line information which is acquired by synthesizing the first flow line information and the second flow line information, and in which determined overlapping of trajectories satisfies a predetermined condition; and processing of causing a display device to display a portion of the trajectories where the trajectories are determined to overlap each other among a flow line represented by the third flow line information, in a pattern different from non-overlapping portions of the flow line represented by the third flow line information.

14. The non-transitory recording medium according to claim 13, wherein the program causes the computer to execute:
   determining the overlapping by comparing a position included in each of the first flow line information and the second flow line information, and a point of time at the position.

* * * * *